United States Patent [19]

Kioka et al.

[11] Patent Number: 4,822,840

[45] Date of Patent: Apr. 18, 1989

[54] LOW-CRYSTALLINE PROPYLENE RANDOM COPOLYMER COMPOSITION, PROCESS FOR PRODUCTION THEREOF, AND POLYPROPYLENE COMPOSITE LAMINATED STRUCTURE

[75] Inventors: Mamoru Kioka; Masahiro Sugi; Akinori Toyota; Norio Kashiwa, all of Iwakuni, Japan

[73] Assignee: Mitsui Petrochemical Industries, Ltd., Tokyo, Japan

[21] Appl. No.: 106,585

[22] Filed: Oct. 9, 1987

[30] Foreign Application Priority Data

Oct. 9, 1986 [JP] Japan .................. 61-239340
Oct. 9, 1986 [JP] Japan .................. 61-239341
Jul. 15, 1987 [JP] Japan .................. 62-174833

[51] Int. Cl.$^4$ .................. C08L 23/16; C08L 53/00; C08F 255/04
[52] U.S. Cl. .................. 525/240; 525/322; 525/323; 525/243; 525/268; 928/516
[58] Field of Search .................. 525/240, 323

[56] References Cited

U.S. PATENT DOCUMENTS

| | | | |
|---|---|---|---|
| 4,334,040 | 6/1982 | Fujii et al. | 525/323 |
| 4,433,110 | 2/1984 | Baba et al. | 525/323 |
| 4,454,306 | 6/1984 | Fujii et al. | 525/323 |
| 4,502,263 | 3/1985 | Crass et al. | 53/396 |
| 4,547,552 | 10/1985 | Toyota et al. | 525/323 |
| 4,726,999 | 2/1988 | Kohyama et al. | 525/240 |
| 4,734,459 | 3/1988 | Cecchin et al. | 525/323 |

FOREIGN PATENT DOCUMENTS

| | | |
|---|---|---|
| 1164129 | 3/1984 | Canada . |
| 202946A | 5/1985 | European Pat. Off. . |
| 57010611 | 6/1980 | Japan . |
| 58-008717 | 1/1983 | Japan . |
| 58-104913 | 6/1983 | Japan . |
| 58-145718 | 8/1983 | Japan . |

*Primary Examiner*—Carman J. Seccuro
*Attorney, Agent, or Firm*—Sherman & Shalloway

[57] ABSTRACT

A novel low-crystalline propylene random copolymer composition comprising

[I] 60 to 95% by weight of a propylene random copolymer and

[II] 5 to 40% by weight of a low-crystalline propylene random copolymer which has excellent heat-sealability, heat-seal imparting property, transparency and antiblocking property and containing a reduced amount of a hydrocarbon-soluble component, a process for production thereof, and polypropylene composite laminated structure having improved heat-sealability and heat seal strength at low temperatures.

3 Claims, 2 Drawing Sheets

LOW-CRYSTALLINE PROPYLENE RANDOM COPOLYMER COMPOSITION, PROCESS FOR PRODUCTION THEREOF, AND POLYPROPYLENE COMPOSITE LAMINATED STRUCTURE

FIELD OF THE INVENTION

This invention relates to a novel low-crystalline propylene random copolymer composition, a process for production thereof, and a composite laminated structure produced by laminating the copolymer composition to a polypropylene substrate.

More specifically, it relates to a low-crystalline propylene random copolymer composition which has excellent heat-sealability, heat-seal imparting property, transparency and antiblocking property and containing a reduced amount of a hydrocarbon-soluble component, is suitable for production of films, particularly packaging films such as shrinkable films for use in food packaging, and can be formed into a composite laminated structure having improved heat sealing property by laminating it to the surface of a crystalline polypropylene substrate; a process for production thereof, and to a polypropylene composite laminated structure having improved heat-sealability and heat seal strength at low temperatures.

DESCRIPTION OF THE PRIOR ART

Polypropylene has found extensive use because of its excellent physical properties, for example as films in food packaging application. In applications of this type, it is the usual practice to copolymerize about 1 to 5% by weight of ethylene with propylene and offer a propylene/ethylene random copolymer in order to improve heat-sealability at low temperatures. A film of such a modified polypropylene has the advantage of better transparency or scratch resistance than films of low-density polyethylene likewise used for packaging, but still has inferior heat-sealability at low temperatures. Increasing the amount of ethylene to be copolymerized is one method of further improving heat-sealability. According to this method, the proportion of a useless soluble copolymer increases and the yield of the desired copolymer decreases. Furthermore, the antiblocking property or transparency of a film prepared from the resulting product is reduced. Moreover, in slurry polymerization, the characteristics of the slurry during polymerization are deteriorated, and may even make the polymerization difficult.

In an attempt to overcome such disadvantages, Japanese Laid-Open Patent Publications Nos. 35487/1974, 79195/1976 and 16588/1977 proposed a method in which propylene is copolymerized with ethylene and an alpha-olefin having at least 4 carbon atoms using a conventional titanium trichloride catalyst. According to this proposal, the proportion of a solvent-soluble copolymer formed is decreased as compared with the case of copolymerizing propylene with ethylene. However, as compared with the homopolymerization of propylene, the proportion of the solvent-soluble copolymer is still large. This tendency increases as the amounts of ethylene and the alpha-olefin having at least 4 carbon atoms increase.

The present inventors found that when a supported catalyst prepared from a specific solid titanium catalyst component, an organometallic compound and an electron donor which gives nearly the same proportion of a solvent-soluble copolymer in the homopolymerization of propylene as the titanium trichloride catalyst used in the above proposals is used in the copolymerization of propylene, ethylene and an alpha-olefin having at least 4 carbon atoms, the proportion of the soluble polymer can unexpectedly be decreased further and very superior results can be obtained in regard to the yield of the desired copolymer and the catalyst efficiency as compared with the case of using the titanium trichloride catalyst used in the above proposals. The inventors proposed this technique in Japanese Laid-Open Patent Publication No. 26891/1979. Use of the catalyst specifically disclosed in this patent document resulted in a marked improvement. But when it is desired to produce a copolymer having a considerably high content of ethylene, difficulties are still encountered. For example, a porridge-like copolymer forms to degrade the characteristics of the slurry and the polymerization becomes difficult to continue. Or a solid polymer cannot be obtained in a sufficiently high yield. If the ethylene content cannot be increased to obtain a copolymer having a low melting point, there is no way but to increase the content of the alpha-olefin having at least 4 carbon atoms. The effect of lowering the melting point is lower in the alpha-olefin and moreover, the rate of copolymerization of the alpha-olefin is slow. Hence, it is not advisable to increase the content of the alpha-olefin too much.

The present inventors further proposed in Japanese Laid-Open Patent Publication No. 47210/1984 a process in which a copolymer of propylene, ethylene and an alpha-olefin having at least 4 carbon atoms which is suitable for production of films having excellent heat-sealability can be obtained in large amounts and high yields while decreasing the amount of an undesirable by-product soluble copolymer. The copolymer obtained by this method, however, do not have entirely satisfactory heat-sealability, transparency and antiblocking property, and the amount of the hydrocarbon-soluble component is not as small as is fully satisfactory.

The propylene copolymers in the prior art described above are obtained by random copolymerization.

On the other hand, alpha-olefin copolymers obtained by block copolymerization are also known.

Japanese Laid-Open Patent Publication No. 162620/1983 discloses an alpha-olefin block copolymer having excellent heat-sealability, transparency and antiblocking property which is obtained by block copolymerization of alpha-olefins. This olefinic block copolymer, however, does not have heat-sealability, antiblocking property and heat seal strength retention (even when the film is heat-sealed after storage of the film at an elevated temperature, the strength of the heat seal does not decrease) which are comparable to those of the polyolefin composition disclosed in Japanese Patent Publication No. 24375/1982.

Crystalline polypropylene films are extensively used in the field of packaging, particularly packaging of foods because they have excellent mechanical properties such as tensile strength, rigidity, surface hardness and impact strength, optical properties such as gloss and transparency, and food sanitary characteristics such as non-toxicity and non-odorous property. The polyproylene films, however, have the defect that with a single layer of a polypropylene film, the heat sealable temperature is high and a proper temperature range is narrow.

In an attempt to improve the heat-sealability of such a polypropylene film, some methods have already been proposed in which a lower-melting resin is laminated on one or both surfaces of a crystalline polypropylene film.

For example, Japanese Laid-Open Patent Publication No. 65552/1980 discloses a method in which a propylene random copolymer composition composed of an ethylene/propylene random copolymer containing propylene as a main component and a propylene/alpha-olefin random copolymer containing propylene as a main component is laminated to a crystalline polypropylene film. Furthermore, Japanese Laid-Open Patent Publication No. 91665/1980 discloses a method in which a propylene random copolymer composition composed of an ethylene propylene random copolymer composed of propylene as a main component and a 1-butene/ethylene random copolymer containing 1-butene as a main component is laminated to a crystalline polypropylene film. Japanese Laid-Open Patent Publication No. 106585/1979 discloses a method in which a propylene random copolymer composition composed of an ethylene/propylene random copolymer containing propylene as a main component, a 1-butene/ethylene/unsaturated monomer copolymer containing 1-butene as a main component, and a low-molecular-weight thermoplastic resin is laminated to a crystalline polypropylene film. Furthermore, U.S. Pat. No. 4,230,767 claiming priority from the above-cited Japanese Laid-Open Patent Publication No. 91665/1980 (Application No. 165137/1978) and the above cited Japanese Laid-Open Patent Publication No. 106585/1979 (Application No. 13932/1978) discloses a propylene random copolymer composition which could include the above omposition composed of an ethylene/propylene random copolymer containing propylene as a main component and a 1-butene/propylene copolymer containing 1-butene as a component and an embodiment which could read on the lamination of such a propylene random copolymer composition to a crystalline polypropylene film. However, the U.S. patent quite fails to give a specific example of the above embodiment, and shows only an example in which a lower-molecular-weight thermoplastic resin is further used together as specified in the above-cited Japanese Laid-Open Patent Publication No. 106585/1979.

In the laminated structures obtained by the above-mentioned methods, the heat-sealability of the propylene film is improved, but the heat-sealable temperature is still high and the range of applicable temperatures is still narrow. Furthermore, the heat-seal strength of the film is not sufficient enough. Moreover, since the copolymer contains an unnegligible amount of a component which dissolves in a hydrocarbon solvent such as xylene and hexane, these laminated structures also have had only limited applications in the field of food packaging.

In order to impart antistatic property to these composite polypropylene laminated structures, it is the usual practice to subject them to low-temperature heat-treatment for several days. This, however, brings about the defect that the heat-sealing temperature considerably increases. Accordingly, in the field of food packaging with such polypropylene films, it has been strongly desired to provide a composite polypropylene film which has a lowered heat-sealable temperature, a broadened range of applicable temperatures for heat sealing and an excellent heat-seal strength, increases little in heat sealable temperature by heat-treatment, and contains a very little component which dissolves in a hydrocarbon solvent.

SUMMARY OF THE INVENTION

It is an object of this invention therefore to provide a low-crystalline propylene random copolymer composition which can give a composite polypropylene laminated structure having excellent low-temperature heat sealability and excellent heat seal strength by laminating it to at least one surface of a crystalline polypropylene substrate layer.

Another object of this invention is to provide a process which can give a propylene random copolymer composition having excellent heat sealability, transparency and antiblocking property and a small content of a component soluble in a hydrocarbon, which has better heat-seslability, antiblocking property and heat seal strength retention, and a smaller content of a solvent-soluble content than presently known propylene random copolymer compositions (blends), without substantial losses of the resulting copolymers.

Still another object of this invention is to provide a heat-sealable composite polypropylene laminated structure which has excellent low-temperature heat sealability, heat seal strength good antiblocking property and which rises little in heat-sealable temperature by heat-treatment.

According to this invention, the above objects are achieved by a low-crystalline propylene random copolymer composition comprising

[I] 60 to 95% by weight of a propylene random copolymer characterized by
  (A) being composed of 97 to 86 mole % of recurring units (a) derived from propylene, 0.5 to 6 mole % of recurring units (b) derived from ethylene and 2 to 13 mole % of recurring units (c) derived from an alpha-olefin having 4 to 20 carbon atoms, the mole ratio of c/(b+c) being from 0.3 to 0.9,
  (B) having an intrinsic viscosity $[\mu]$, measured in decalin at 135° C., of from 0.5 to 6 dl/g,
  (C) having a melting point [Tm], measured by a differential scanning calorimeter, of from 115° to 145° C., and
  (D) having a crystallinity, measured by X-ray diffractometry, of from 30 to 60%, and

[II] 5 to 40% by weight of a low-crystalline propylene random copolymer composed of 10 to 90 mole % of recurring units (d) derived from propylene and 10 to 90 mole % of recurring units (e) derived from an alpha-olefin having 4 to 20 carbon atoms,
said composition having (i) 75 to 96 mole % of recurring units (f) derived from propylene, 0.3 to 5 mole % of recurring units (g) derived from ethylene and 4 to 20 mole % of recurring units (h) derived from an alpha-olefin containing 4 to 20 carbon atoms, (ii) an intrinsic viscosity [η], measured in decalin at 135° C., of from 0.5 to 6 dl/g, (iii) a crystallinity, measured by X-ray diffractometry, of from 25 to 60%, (iv) a p-xylene-soluble content at 25° C. of not more than 30% by weight, and (v) an n-hexane-extracted content at 50° C. of not more than 10% by weight.

The above objects are also achieved by a process for producing a low-crystalline propylene random copolymer composition, which comprises, in combination, (1) a suspension polymerization step of copolymerizing propylene, ethylene and an alpha-olefin having 4 to 20 carbon atoms in liquid propylene as a solvent in the presence of an alpha-olefin pre-polymerized catalyst and optionally an electron donor, said catalyst being obtained by pre-polymerizing an alpha-olefin having 2 to 10 carbon atoms in the presence of a catalyst formed from (A) a highly active and highly stereoregular titanium catalyst component comprising magnesium, titanium, halogen and an electron donor as essential ingredients and having an average particle diameter of about 5 to about 200 microns and a geometric standard deviation of its particle size distribution of less than 2.1, (B) an organometallic compound of a metal of Groups I to III of the periodic table and (C) an electron donor, the amount of the alpha-olefin being 1 to 2000 g per gram of the titanium catalyst component (A), (2) a step of vaporizing the liquid unreacted materials in the polymerization reaction mixture obtained in the suspension polymerization step (1) by flushing, thereby to form a propylene random copolymer [I] composed of 86 to 97 mole % of recurring units (a) derived from propylene, 0.5 to 6 mole % of recuring units (b) derived from ethylene and 2 to 13 mole % of recurring units (c) derived from an alpha-olfein having 4 to 20 carbon atoms, the mole ratio c/(b+c) being from 0.3 to 0.9, and (3) a vapor-phase polymerization step of copolymerizing propylene and an alpha-olefin having 4 to 20 carbon atoms in the presence of the propylene random copolymer [I] under such conditions that the reaction system form a vapor phase, thereby to form a low-crystalline propylene random copolymer [II] composed of 10 to 90 mole % of recurring units (d) derived from propylene and 10 to 90 mole % of recurring units (e) derived from the alpha-olefin having 4 to 20 carbon atoms; and also by a process for producing a low-crystalline propylene random copolymer composition, which comprises, in combination, (1) a suspension polymerization step of copolymerizing at least propylene, ethylene and an alpha-olefin having 4 to 20 carbon atoms in liquid propylene as a solvent in the presence of an alpha-olefin pre-polymerized catalyst and an electron donor, said catalyst being obtained by pre-polymerizing an alpha-olefin having 2 to 10 carbon atoms in the presence of a catalyst formed from (A) a highly active and highly stereoregular titanium catalyst component comprising magnesium, titanium, halogen and an electron donor as essential ingredients and having an average particle diameter of about 5 to about 200 microns and a geometric standard deviation of its particle size distribution of less than 2.1 and (B) an organometallic compound of a metal of Groups I to III of the periodic table, the amount of the alpha-olefin being 1 to 2000 g per gram of the titanium catalyst component (A), (2) a step of vaporizing the liquid unreacted materials in the polymerization reaction mixture obtained in the suspension polymerization step (1) by flushing, thereby to form a propylene random copolymer [I] composed of 86 to 97 mole % of recurring units (a) derived from propylene, 0.5 to 6 mole % of recuring units (b) derived from ethylene and 2 to 13 mole % of recurring units (c) derived from an alpha-olfein having 4 to 20 carbon atoms, the mole ratio c/(b+c) being from 0.3 to 0.9, and (3) a vapor-phase polymerization step of copolymerizing propylene and an alpha-olefin having 4 to 20 carbon atoms in the presence of the propylene random copolymer [I] and under such conditions that the reaction system forms a vapor phase, thereby to form a low-crystalline propylene random copolymer [II] composed of 10 to 90 mole % of recurring units (d) derived from propylene and 10 to 90 mole % of recurring units (e) derived from the alpha-olefin having 4 to 20 carbon atoms.

The above objects are also achieved by a process for producing a low-crystalline propylene random copolymer composition in at least two vapor-phase polymerization steps, which comprises (a) a first-stage vapor-phase polymerization step of producing a propylene random copolymer [I] composed of 86 to 97 mole % of recurring units (a) derived from propylene, 0.5 to 6 mole % of recuring units (b) derived from ethylene and 2 to 13 mole % of recurring units (c) derived from an alpha-olefin having 4 to 20 carbon atoms, the mole ratio c/(b+c) being from 0.3 to 0.9 in the presence of an alpha-olefin pre-polymerized catalyst and optionally an electron donor, said catalyst being obtained by pre-polymerizing an alpha-olefin having 2 to 10 carbon atoms in the presence of a catalyst formed from (A) a highly active and highly stereoregular titanium catalyst component comprising magnesium, titanium, halogen and an electron donor as essential ingredients and having an average particle diameter of about 5 to about 200 microns and a geometric standard deviation of its particle size distribution of less than 2.1, (B) an organometallic compound of a metal of Groups I to III of the periodic table and (C) an electron donor, the amount of the alpha-olefin being 1 to 2000 g per gram of the titanium catalyst component (A), and (b) a second-stage vapor-phase polymerization step of copolymerizing at least propylene and an alpha-olefin containing 4 to 20 carbon atoms in the presence of the propylene random copolymer [I] to produce a random copolymer composed of 10 to 90 mole % of recurring units (d) derived from propylene and 10 to 90 mole % of recurring units (e) derived from the $C_4$–$C_{20}$ alpha-olefin.

The above objects are also achieved by a process for producing a low-crystalline propylene random copolymer composition in at least two vapor-phase polymerization steps, which comprises (a) a first-stage vapor-phase polymerization step of producing a propylene random copolymer [I] composed of 86 to 97 mole % of recurring units (a) derived from propylene, 0.5 to 6 mole % of recurring units (b) derived from ethylene and 2 to 13 mole % of recurrig units (c) derived from an alpha-olefin having 4 to 20 carbon atoms, the mole ratio c/(b+c) being from 0.3 to 0.9 in the presence of an alpha-olefin pre-polymerized catalyst and an electron donor, said catalyst being obtained by pre-polymerizing an alpha-olefin having 2 to 10 carbon atoms in the presence of a catalyst formed from (A) a highly active and highly stereoregular titanium catalyst component comprising magnesium, titanium, halogen and an electron donor as essential ingredients and having an average particle diameter of about 5 to about 200 microns and a geometric standard deviation of its particle size distribution of less than 2.1 and (B) an organometallic compound of a metal of Groups I to III of the periodic table, the amount of the alpha-olefin being 1 to 2000 g per gram of the titanium catalyst component (A), and (b) a second-stage vapor-phase polymerization step of copolymerizing at least propylene and an alpha-olefin having 4 to 20 carbon atoms in the presence of the propylene random copolymer [I] to produce a random copolymer composed of 10 to 90 mole % of recurring units (d) derived from propylene and 10 to 90 mole % of recurring units (e) derived from the $C_4$–$C_{20}$ alpha-olefin.

According to the invention, the above objects are also achieved by a composite polypropylene laminated structure comprising a substrate layer of crystalline polypropylene and on at least one surface thereof, a layer of a low-crystalline propylene random copolymer, said low-crystalline propylene random copolymer composition comprising

[I] 60 to 95% by weight of a propylene random copolymer characterized by
(A) being composed of 97 to 86 mole % of recurring units (a) derived from propylene, 0.5 to 6 mole % of recurring units (b) derived from ethylene and 2 to 13 mole % of recurring units (c) derived from an alpha-olefin having 4 to 20 carbon atoms, the mole ratio of c/(b+c) being from 0.3 to 0.9,
(B) having an intrinsic viscosity [η], measured in decalin at 135° C., of from 0.5 to 6 dl/g,
(C) having a melting point [Tm], measured by a differential scanning calorimeter, of from 115° to 145° C., and
(D) having a crystallinity, measured by X-ray diffractometry, of from 30 to 60%, and

[II] 5 to 40% by weight of a low-crystalline propylene random copolymer composed of 10 to 90 mole % of recurring units (d) derived from propylene and 10 to 90 mole % of recurring units (e) derived from an alpha-olefin having 4 to 20 carbon atoms, said composition having
(i) 75 to 96 mole % of recurring units (f) derived from propylene, 0.3 to 5 mole % of recurring units (g) derived from ethylene and 4 to 20 mole % of recurring units (h) derived from an alpha-olefin containing 4 to 20 carbon atoms,
(ii) an intrinsic viscosity [η], measured in decalin at 135° C., of from 0.5 to 6 dl/g
(iii) a crystallinity, measured by X-ray diffractometry, of from 25 to 60%,
(iv) a p-xylene-soluble content at 25° C. of not more than 30% by weight, and
(v) an n-hexane-extracted content at 50° C. of not more than 10% by weight.

DETAILED DESCRIPTION OF THE PREFERRED EMBODIMENTS

Figure 1:
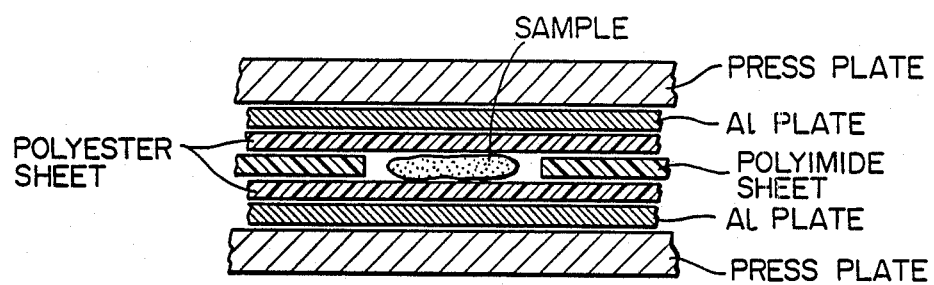

The present inventors have made investigations in order to develop a low-crystalline composition which can form a composite polypropylene laminated structure having excellent low-temperature heat sealability and heat seal strength by being laminated to at least one surface of a substrate layer of crystalline polypropylene. These investigations have led to the discovery that a laminated structure obtained by laminating a low-crystalline propylene random copolymer comprising [I] a propylene random copolymer obtained by copolymerizing propylene, ethylene and an alpha-olefin having 4 to 20 carbon atoms and [II] a low-crystalline propylene random copolymer obtained by copolymerizing propylene and an alpha-olefin having 4 to 20 carbon atoms to at least one surface of a substrate layer of crystalline polypropylene can be heat-sealed at relatively low temperatures with a broad range of applicable temperatures in heat sealing and excellent heat seal strength, rises little in heat-sealable temperature by heat-treatment, and contains small amounts of components which dissolve in a hydrocarbon solvent.

The low-crystalline propylene random copolymer composition, the process for production thereof, the composite laminated structure comprising the composition in accordance with this invention will be described in detail.

I. Low-crystalline propylene random copolymer composition

The propylene random copolymer [I] constituting the low-crystalline propylene random copolymer composition of this invention is a copolymer containing propylene as main component and composed at least of recurring units (a) derived from propylene, recurring units (b) derived from ethylene and recurring units (c) derived from an alpha-olefin having 4 to 20 carbon atoms.

The propylene random copolymer [I] is composed of 86 to 97 mole %, preferably 88 to 96 mole %, more preferably 89 to 95 mole %, of the recurring units (a), 0.5 to 6 mole %, preferably 1 to 5 mole %, more preferably 1.5 to 4 mole %, of the recurring units (b), and 2 to 13 mole %, preferably 3 to 11 mole %, more preferably 4 to 9 mole %, of the recurring units (c).

Examples of the alpha-olefin having 4 to 20 carbon atoms constituting the propylene random copolymer [I] are 1-butene, 1-pentene, 1-hexene, 4-methyl-1-pentene, 1-octene, 1-decene and 1-dodecene. 1-Butene is preferred. They may be used either singly or in combination.

The mole ratio c/(b+c) is from 0.3 to 0.9, preferably from 0.4 to 0.8, more preferably from 0.5 to 0.8.

The propylene random copolymer (I) has an intrinsic viscosity, measured in decalin at 135° C., of 0.5 to 6 dl/g, preferably 1 to 5 dl/g.

The propylene random copolymer [I] has a melting point [Tm] (°C.), measured by a differential scanning calorimeter, of 115° to 145° C., preferably 120° to 135° C.

The DSC melting point of the propylene random copolymer is measured at a temperature raising rate of 10° C./min. over a range of 0° to 200° C. on a 0.1 mm-thick press sheet sample after 20 hours from molding, and the maximum endothermic peak is defined as Tm.

The propylene random copolymer [I] has a crystallinity, measured by X-ray diffractometry, of 30 to 60%, preferably 35 to 55 % (D).

The crystallinity is measured by X-ray diffractometry on a 1.5 mm-thick press sheet (after the lapse of 20 hours from formation) at 180° C. for 10 minutes and then at 25° C. for 10 minutes.

The propylene random copolymer [I] meets a combination of the characteristics (A) to (D) above, and preferably meets the requirement (E) that its n-decane-soluble content at 25° C. ($W_1$ wt. %) is defined as follows:

$$0.03(165-Tm) \leq W_1 \leq 0.20 (165-Tm),$$

preferably $$0.03(165-Tm) \leq W_1 \leq 0.15 (165-Tm)$$

wherein Tm is the dimensionless number of the melting point of the copolymer.

The n-decane-soluble content at 25° C. of the propylene random copolymer [I] is measured and determined by the following method. A 1-liter flask equipped with a stirring vane is charged with a sample of the copolymer, 0.3 g of 2,6-di-t-butyl-4-methylphenol and 500 ml of n-decane, and they are dissolved on an oil bath at 140° C. For about 3 hours after dissolving, the solution was allowed to cool spontaneously at room temperature for about 3 hours, and then cooled on a water bath at 25° C. for 12 hours. The precipitated copolymer and the n-decane solution containing the dissolved polymer are separated by filtration through a G-4 glass filter. The filtrate is dried at 150° C. under 10 mmHg until its weight becomes constant, and the polymer dissolved in n-decane is collected. Its weight is measured, and the percentage of the weight of the polymer based on the sample copolymer is calculated and defined as the n-decane-soluble content of the copolymer.

The low-crystalline propylene random copolymer [II] constituting the low-crystalline random copolymer composition is derived at least from propylene and an alpha-olefin having 4 to 20 carbon atoms. It is composed of 10 to 90 mole %, preferably 30 to 85 mole %, especially preferably 50 to 80 mole %, of recurring units (d) derived from propylene, and 10 to 90 mole %, preferably 15 to 70 mole %, especially preferably 20 to 50 mole %, of recurring units (e) derived from the alpha-olefin.

Examples of the alpha-olefin having 4 to 20 carbon atoms constituting the low-crystalline propylene random copolymer [II] are 1-butene, 1-pentene, 1-hexene, 4-methyl-1-pentene, 1-octene, 1-decene and 1-dodecene. 1-Butene is preferred. They may be used either singly or in combination.

The copolymer [II] has as an intrinsic viscosity $[\eta]$, measured in decalin at 135° C., of usually 1 to 6 dl/g, preferably 1.5 to 4 dl/g, more preferably 1.6 to 3.5 dl/g. It has a melting point [Tm], measured by a differential scanning calorimeter, of usually 110° to 145° C., preferably 115° to 130° C., and a crystallinity, determined by X-ray diffractometry, of usually 20 to 60%, preferably 30 to 50%.

The low-crystalline propylene random copolymer composition of this invention is formed from the propylene random copolymer [I] and the low-crystalline propylene random copolymer [II].

The proportion of the low-crystalline propylene random copolymer [II] contained in the low-crystalline random copolymer composition of this invention is 5 to 40% by weight, preferably 8 to 30% by weight, more preferably 12 to 25% by weight, and the proportion of the propylene random copolymer [I] contained in it is 60 to 95% by weight, preferably 70 to 92% by weight, more preferably 75 to 88% by weight.

The low-crystalline propylene random copolymer composition of this invention as a whole is composed of 96 to 75 mole %, preferably 94 to 80 mole %, more preferably 92 to 84 mole % of reducing units (f) derived from propylene, 0.3 to 5 mole %, preferably 0.7 to 4.5 mole %, more preferably 1 to 4 mole %, of recurring units (g) derived from ethylene, and 4 to 20 mole %, preferably 5 to 15 mole %, more preferably 7 to 12 mole %, of recurring units (h) derived from the alpha-olefin containing 4 to 20 carbon atoms characteristic [(i)].

The intrinsic viscosity $[\eta]$, measured in decalin at 135° C., of the low-crystalline random copolymer composition of this invention is 0.5 to 6 dl/g, preferably 1 to 5 dl/g, more preferably 1.5 to 4 dl/g, especially preferably 1.7 to 3.5 dl/g [characteristic (ii)]. This characteristic value is a measure of the molecular weight of the low-crystalline propylene random copolymer composition of this invention and, in combination with the other characteristics, contributes to the excellent properties described hereinabove.

The crystallinity of the copolymer composition of this invention measured by X-ray diffractometry is 25 to 60%, preferably 30 to 55%, more preferably 35 to 50%. This characteristic value is a measure of the excellent tensile properties of the composition of this invention, and in combination with the other characteristics, contributes to the excellent properties described hereinabove.

The amount of a component soluble in p-xylene at 25° C. in the low-crystalline propylene random copolymer composition of this invention is not more than 30% by weight, preferably not more than 25% by weight [characteristic (iv)]. The amount of a portion of the copolymer composition of this invention which is extracted with n-hexane at 50° C. is not more than 10% by weight, preferably not more than 8% by weight, more preferably not more than 6% by weight [characteristic (v)].

In the present invention, the amount of a portion of the copolymer composition which is soluble in p-xylene at 25° C. is measured and determined by the following method. A 2-liter flask equipped with a stirring vane and a reflux condenser is charged with 5 g of a sample of the copolymer composition and 1 liter of p-xylene. Under refluxing of p-xylene, they were maintained for at least 2 hours to dissolve the sample in p-xylene. Thereafter, under air cooling, the contents of the flask are cooled to 50° C., and the flask was put in a cold water bath and rapidly coole to 25° to 30° C. The flask is transferred to a constant-temperature vessel maintained at 25° C., and maintained in this state for 2 hours. The precipitated copolymer composition and the p-xylene suspension containing the dissolved copolymer composition are separated by filtration through a G-4 glass filter. The filtrate is dried to a constant weight at 150° C. under a reduced pressure of about 10 mmHg. The copolymer composition which has been dissolved in p-xylene at 25° C. is collected and its weight is measured. The percentage of the measured weight based on the weight of the copolymer composition sample is calculated and defined as the p-xylene-soluble content of the copolymer composition at 25° C.

The n-hexane-extracted content at 50° C. of the copolymer composition of this invention is measured and determined by the following method. A 2-liter flask equipped with a stirring vane and a reflux condenser is charged with a sample of the copolymer composition and 1 liter of n-hexane, and the contents are heated to 50° C. and maintained at this temperature for 2 hours. While the resulting suspension is still hot, it is filtered through a G-4 glass filter. The filtrate is dried to a constant weight at 150° C. under a reduced pressure of about 10 mmHg. The copolymer composition extracted in n-hexane at 50° C. is collected and its weight is measured. The percentage of the measured weight based on the amount of the copolymer composition sample is calculated and defined as the n-hexane-extracted content of the copolymer composition at 50° C.

II. Process for Producing the Low-Crystalline Random Copolymer Composition

The low-crystalline propylene random copolymer composition of this invention may be produced by, for example, uniformly mixing the propylene random copolymer [I] and the low-crystalline propylene random copolymer [II] by a tumbler, a V-type blender, a Henschel mixer, etc., or by kneading the resulting mixture further in an extruder, a Banbury mixer, a kneader, a roll or the like.

One preferred example of the process for producing the low-crystalline propylene random copolymer composition involves using a polymerization apparatus consisting of a plurality of polymerization vessels connected to each other in series at least comprising a polymerization vessel for producing the propylene random copolymer [I] and a polymerization vessel for producing the low-crystalline propylene random copolymer [II], and thereby producing the low-crystalline propylene random copolymer composition directly.

Specific examples of such a process are as follows:

(1) A process for producing the low-crystalline propylene random copolymer at least comprising (1) a suspension polymerization step in propylene as a solvent, (2) a flushing step for vaporizing liquid propylene, and (3) a vapor-phase polymerization step, wherein the propylene random copolymer [I] is synthesized in the suspension polymerization step (1) or in the suspension polymerization step (1) and the flushing step (2), and the low-crystalline propylene random copolymer [II] is produced in the vapor-phase polymerization step (3).

(2) A process for producing a low-crystalline propylene random copolymer composition which comprises at least two vapor-phase polymerization steps, wherein the propylene random copolymer [I] and the low-crystalline propylene random copolymer [II] are synthesized respectively in separate vapor-phase polymerization steps.

As one example of the process for directly producing the low-crystalline propylene random copolymer composition of this invention using the multistage polymerization apparatus, propylene, ethylene and an alpha-olefin having 4 to 20 carbon atoms are copolymerized by the method (1) or (2) above in the presence of an alpha-olefin pre-polymerized catalyst obtained by pre-polymerizing an alpha-olefin having 2 to 10 carbon atoms in the presence of a catalyst formed from (A) a highly active and highly stereoregular titanium catalyst component comprising magnesium, titanium, halogen and an electron donor as essential ingredients and having an average particle diameter of about 5 to about 200 microns and a geometric standard deviation of its particle size distribution of less than 2.1, (B) an organometallic compound of a metal of Groups I to III of the periodic table and (C) an electron donor, the amount of the alpha-olefin being 1 to 2000 g per gram of the titanium catalyst component (A), to thereby produce a propylene random copolymer [I]; and then in the presence of the resulting propylene random copolymer [I], propylene and an alpha-olfein having 4 to 20 carbon atoms are copolymerized to thereby form a low-crystalline propylene random copolymer [II]. As a result, the low-crystalline propylene random copolymer composition of this invention can be formed.

More specifically, the following process may be cited as a process for producing the low-crytstalline propylene random copolymer composition of this invention.

A process for producing a low-crystalline propylene random copolymer composition, which comprises, in combination, (1) a suspension polymerization step of copolymerizing propylene, ethylene and an alpha-olefin having 4 to 20 carbon atoms in liquid propylene as a solvent in the presence of an alpha-olefin pre-polymerized catalyst and optionally an electron donor, said catalyst being obtained by pre-polymerizing an alpha-olefin having 2 to 10 carbon atoms in the presence of a catalyst formed from (A) a highly active and highly stereoregular titanium catalyst component comprising magnesium, titanium, halogen and an electron donor as essential ingredients and having an average particle diameter of about 5 to about 200 microns and a geometric standard deviation of its particle size distribution of less than 2.1, (B) an organometallic compound of a metal of Groups I to III of the periodic table and (C) an electron donor, the amount of the alpha-olefin being 1 to 2000 g per gram of the titanium catalyst component (A), (2) a flushing step of vaporizing the liquid unreacted materials in the polymerization reaction mixture obtained in the suspension polymerization step (1) by flushig, thereby to form a propylene random copolymer [I] composed of 86 to 97 mole % of recurring units (a) derived from propylene, 0.5 to 6 mole % of recurring units (b) derived from ethylene and 2 to 13 mole % of recurring units (c) derived from an alpha-olfein having 4 to 20 carbon atoms, the mole ratio c/(b+c) being from 0.3 to 0.9, and (3) a vapor-phase polymerization step of copolymerizing propylene and an alpha-olefin having 4 to 20 carbon atoms in the presence of the propylene random copolymer [I] and under such conditions that the reaction system forms a vapor phase, thereby to form a low-crystalline propylene random copolymer [II] composed of 10 to 90 mole % of recurring units (d) derived from propylene and 10 to 90 mole % of recurring units (e) derived from the alpha-olefin having 4 to 20 carbon atoms.

The processes for producing the low-crystalline propylene random copolymer composition of this invention will be described below in detail.

Polymerization Catalyst

The catalyst used in this invention will first be described.

The highly active highly stereoregular solid titanium catalyst component (A) used in this invention contains magnesium, titanium, halogen and an electron donor as essential ingredients. The magnesium/titanium atomic ratio is larger than 1, preferably from 2 to 50, especailly preferably from 6 to 30. The halogen/titanium atomic ratio is preferably 4 to 100, especially preferably 6 to 40. The electron donor/titanium (mole ratio) is preferably 0.1 to 10, especially preferably 0.2 to 6. The titanium catalyst component (A) preferably has a specific surface area of at least 3 m$^2$/g, more preferably at least about 40 m$^2$/g, especially preferably 100 to 800 m$^2$/g. Usually, the titanium compound is not liberated by simple means such as washing with hexane at room temperature. The titanium catalyst component (A) may further contain other elements and metals or functional groups in addition to the essential ingredients. It may also be diluted with an organic or inorganic diluent.

The solid titanium catalyst component (A) has an average particle diameter of 1 to 200 microns, preferably 3 to 100 microns, especially preferably 6 to 50 microns, and a geometric standard deviation of its particle size distribution of less than 2.1, preferably not more than 1.9, especially preferably not more than 1.7.

The particle size distribution of the titanium catalyst particles can be measured by a light transmission method. Specifically, the titanium catalyst component is diluted to a concentration of about 0.01 to 0.5 with an inert solvent such as decalin. The diluted catalyst component is put in a cell. A slender beam of light is applied to the cell, and the intensity of light which passes through the liquid in a certain sedimented condition of the particles is continuously measured, and the particle size distribution is measured. On the basis of this particle size distribution, the standard deviation $\sigma_g$ can be determined from the logarithmic normal distribution function. More specifically, $\sigma_g$ is calculated as the ratio of the average particle diameter ($\theta_{50}$) to the particle diameter ($\theta_{16}$) at which the weight of all particles having smaller particle diameter than $\theta_{50}$ is 16% by weight based on the weight of the entire particles. (i.e., $\theta_{50}/\theta_{16}$).

The solid titanium catalyst component (A) has the ability to produce a highly stereoregular polymer at a high catalytic efficiency. For example, when propylene is homopolymerized under the same conditions, this catalyst component (A) has the ability to produce at least 3,000 g, particularly at least 5,000 g, above all at least 10,000 g, per millimole of Ti of polypropylene having an isotacticity (a boiling n-heptane-insoluble portion) of at least 92%, particularly at least 96%. Preferably, the catalyst component (A) is in the form of true spherical particles, elliptical particles, granular particles, etc.

Use of the titanium catalyst component (A) meeting these requirements makes it possible to produce a copolymer having a high ethylene content with good operability and in high yields.

The titanium catalyst component (A) meeting all of these requirements can be prepared, for example, by forming a magnesium compound whose average particle diameter and particle size distribution and preferably shape as well are within the ranges stated above, and then performing catalyst preparation using the resulting magnesium compound; or by contacting a liquid magnesium compound with a liquid titanium compound, and preparing a solid catalyst so that it has the aforesaid particle characteristics. There may also be used a method in which a magnesium compound, a titanium compound and an electron donor are supported on aforesaid carrier of a uniform shape, or a method in which a fine powdery catalyst prepared from the required ingredients is finally granulated into the aforesaid preferred shape. Such methods are disclosed, for example, in Japanese Laid-Open Patent Publications Nos. 135102/1980, 135103/1980, 811/1981 and 67311/1981 and Japanese Patent Applications Nos. 181019/1981 and 211109/1986.

Typical examples of the method of producing the titanium catalyst component (A) are briefly described below.

(1) A magnesium compound/electron donor complex having an average particle diameter of 200 microns and a geometrical standard deviation of its particle size of less than 2.1 is reacted with a titanium compound which is liquid under the reaction conditions, preferably titanium tetrachloride, with or without pre-treatment with an electron donor and/or an organoaluminum compound or a reaction aid such as a halogen-containing silicon compound.

(2) A magnesium compound in the liquid stage having no reducing ability is reacted with a liquid titanium compound in the presence of an electron donor to precipitate a solid component having an average particle diameter of 5 to 200 microns and a geometrical standard deviation of its particle size distribution of less than 2.1. As required, the product is further reacted with a liquid titanium compound, preferably titanium tetrachloride, with or without an electron donor.

Especially good results are obtained in this invention when in method (1), the magnesium compound/electron donor complex is in the form of spherical solid particles precipitated from a liquid form of the complex, or when the precipitation of the solid component in method (2) is carried out under such conditions as to precipitate spherical solid particles.

Examples of the magnesium compound used in the preparation of the titanium catalyst component (A) include magnesium oxide, magnesium hydroxide, hydrotalcite, magnesium carboxylates, alkoxy magnesiums, aryloxy magnesiums, alkoxy magnesium halides, aryloxy magnesium halides, magnesium dihalides, organomagnesium compounds, and the reaction products of organomagnesium compounds with electron donors, halosilanes, alkoxysilanes, silanols or aluminum compounds. The organoaluminum compounds which may be used in the preparation of the titanium catalyst component (A) may be selected from organoaluminum compounds described hereinbelow which are used in the polymerization of olefins. Examples of the halogen-containing silicon compounds which may be used in the preparation of the titanium catalyst component are silicon tetrahalides, silicon alkoxy halides, silicon alkyl halides and halopolysiloxanes.

Examples of the titanium compound used in the preparation of the titanium catalyst component (A) are titanium halides, alkoxy titanium halides, aryloxy titanium halides, alkoxy titaniums and aryloxy titaniums. The titanium tetrahalides, above all titanium tetrachloride, are preferred.

Examples of the electron donor that can be used in the preparation of the titanium catalyst component include oxygen-containing electron donors such as alcohols, phenols, ketones, aldehydes, carboxylic acids, organic acids esters, inorganic acid esters, ethers, acid amides, acid anhydrides and alkoxysilanes, and nitrogencontaining electron donors such as ammonia, amines, nitriles and isocyanates.

Specific examples are alcohols having 1 to 18 carbon atoms such as methanol, ethanol, propanol, pentanol, hexanol, octanol, dodecanol, octadecyl alcohol, benzyl alcohol, phenethyl alcohol, cumyl alcohol and isopropylbenzyl alcohol; phenols having 6 to 20 carbon atoms which may have a lower alkyl group, such as phenol, cresol, xylenol, ethylphenol, propylphenol, nonylphenol, cumylphenol and naphthol; ketones having 3 to 15 carbon atoms such as acetone, methyl ethyl ketone, methyl isobutyl ketone, acetophenone and benzophenone; aldehydes having 2 to 15 carbon atoms such as acetaldehyde, propioaldehyde, octylaldehyde, benzaldehyde, tolualdehyde and naphthaldehyde; organic acid esters having 2 to 30 carbon atoms such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, dibutyl malonate, diethyl isopropylmalonate, diethyl n-butylmalonate, diethyl phenylmalonate, diethyl 2-allylmalonate, diethyl diisobutylmalonate, diethyl di-n-butylmalonate, di-n-butyl succinate, diethyl methylsuccinate, dibutyl ethylsuccinate, dimethyl maleate, dibutyl maleate, monooctyl maleate, dioctyl maleate, dibutyl butylmaleate, diethyl butylmaleate, di-iso-octyl fumarate, diethyl itaconate, di-n-butyl itaconate, dimethyl citraconate, diethyl 1,2-cyclohexanedicarboxylate, di-2-ethylhexyl 1,2-cyclohexanedicarboxylate, dimethyl phthalate, monoisobutyl phthalate, diethyl phthalate, ethyl-n-butyl phthalate, di-n-propyl phthalate, n-butyl phthalate, isobutyl phthalate, di-n-heptyl phthalate, di-2-ethylhexyl phthalate, di-n-octyl phthalate, dineopentyl phthalate, benzylbutyl phthalate, diphenyl phthalate, di-isobutyl naphthalenedicarboxylate, di-2-ethylhexyl sebacate, gamma-butyrolactone, delta-valerolactone, coumarine, phthalide, and ethylene carbonate; acid halides having 2 to 15 carbon atoms such as acetyl chloride, benzoyl chloride, toluoyl chloride and anisoyl chloride; ethers having 2 to 20 carbon atoms such as dimethyl ether, diethyl ether, diisopropyl ether, dibutyl ether, diisoamyl ether, tetrahydrofuran, anisole and diphenyl ether; acid amides such as acetamide, benzamide and tolukamide; amines such as methylamine, ethylamine diethylamine, tributylamine, piperidine, tribenzylamine, aniline, pyridine, picoline, tetramethylmethylenediamine and tetramethylethylenediamine; nitriles such as acetonitrile, benzonitrile and tolunitrile; organophosphorus compounds having a P-O-C bond such as trimethyl phosphite and triethyl phosphite; and alkoxysilanes such as ethyl silicate and diphenyldimethoxysilane. These electron donors may be used in combination.

The electron donor desirably contained in titanium catalyst component (A) is any of those which have no active hydrogen, such as organic or inorganic acid esters, alkoxy(aryloxy)silane compounds, ethers, ketones, tertriary amines, acid halides and acid anhydrides. The organic esters and the alkoxy(aryloxy)silane compounds are preferred. Among them, esters of aroamtic monocarboxylic acids with alcohols having 1 to 8 carbon atoms, and esters of dicarboxylic acids such as malonic acid, substituted malonic acid, substituted succinic acid, maleic acid, substituted maleic acid, 1,2-cyclohexanedicarboxylic acid and phthalic acid with alcohols having at least 2 carbon atoms are preferred. Needless to say, these electron donors do not have to be used as starting materials in the preparation of the titanium catalyst component. They may be in the form of compounds convertible to these electron donors and be converted to the final forms in the course of the catalyst preparation.

The titanium catalyst component obtained by the various methods illustrated above can be purified by washing it with a liquid inert hydrocarbon. Examples of the inert hydrocarbon used for this purpose include aliphatic hydrocarbons such as n-pentane, isopentane, n-hexane, isohexane, n-heptane, n-octane, isooctane, n-decane, n-dodecane, kerosene and fluid paraffin; alicyclic hydrocarbons such as cyclopentane, methylcyclopentane, cyclohexane and methylcyclohexane; aromatic hydrocarbons such as benzene, toluene, xylene and cymene, halogenated hydrocarbons such as chlorobenzene and dichloroehane, and mixtures of these.

Suitable organometallic compounds used as the catalyst component (B) used in this invention are organoaluminum compounds. Compounds having at least one Al-carbon bond in the molecule can be utilized. For example, they include (i) organoaluminum compounds of the general formula $R_m^1Al(OR^2)_nH_pX_q$ (wherein $R^1$ and $R^2$ are identical or different and each represents a hydrocarbon group having 1 to 15 carbon atoms, preferably 1 to 4 carbon atoms, X represents halogen, m is $0<m\leq 3$, n is $0\leq n<3$, p is $0\leq p<3$, and 9 is $0\leq q<3$, and $m+n+p+q=3$), and (ii) complex alkylated compounds of aluminum with metals of Group I of the periodic table, represented by the general formula $M^1AlR_4^1$ (wherein $M^1$ is Li, Na or K, and $R^1$ is as defined above).

Examples of the organoaluminum compounds belonging to (i) above are compounds of the general formulae $R_m^1Al(OR^2)_{3-m}$ (wherein $R^1$ and $R^2$ are as defined above, and m is preferably $1.5\leq m\leq 3$): $R_m^1AlX_{3-m}$ (wherein $R^1$ and X are as defined above, and m is preferably $0<m<3$); $R_m^1AlH_{3-m}$ (wherein $R^1$ is as defined above, and m is preferably $2\leq m<3$), and $R_m^1Al(OR^2)_nX_q$ (wherein $R^1$, $R^2$ and X are as defined above, and $0\leq m<3$, $0\leq n<3$, $0\leq q<3$, $m+n+q=3$).

Specific examples of the aluminum compounds under (i) include trialkyl aluminums such as triethyl aluminum and tributyl aluminum; trialkenyl aluminums such as triisoprenyl aluminum; dialkyl aluminum alkoxides such as diethyl aluminum ethoxide and dibutyl aluminum butoxide; alkyl aluminum sesquialkoxides such as ethyl aluminum sesquiethoxide and butyl aluminum sesquibutoxide; partially alkoxylated alkyl aluminums having the average composition represented by $R_{2.5}^1Al(OR^2)_{0.5}$; partially hydrogenated alkyl aluminums, for example dialkyl aluminum halides such as diethyl aluminum chloride, dibutyl aluminum chloride and diethyl aluminum bromide, alkyl aluminum sesquihalides such as ethyl aluminum sesquichloride, butyl aluminum sesquichloride and ethyl aluminum sesquibromide, and alkyl aluminum dihalides such as ethyl aluminum dichloride, propyl aluminum dichloride and butyl aluminum dibromide; partially hydrogenated alkyl aluminums, for example dialkyl aluminum hydrides such as diethyl aluminum hydride and dibutyl aluminum hydride and alkyl aluminum dihydrides such as ethyl aluminum dihydride and propyl aluminum dihydride; and partially alkoxylated and halogenated alkyl aluminums such as ethyl aluminum ethoxychloride, butyl aluminum butoxychloride and ethyl aluminum ethoxybromide. As compounds similar to (i), organoaluminum compounds in which two or more aluminums are bonded through an oxygen or nitrogen atom may also be cited. Examples of such compounds are

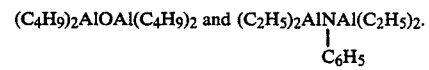

Examples of the compounds (ii) are $LiAl(C_2H_5)_4$ and $LiAl(C_7H_{15})_4$.

Among these, the trialkyl aluminums or mixtures of the trialkyl aluminums and the alkyl aluminum halides or aluminum halides are preferred.

Examples of the electron donor used as component (C) include amines, amides, ethers, ketones, nitriles, phosphines, stibines, arsines, phosphoramides, esters, thioesters, acid anhydrides, acid halides, aldehydes, alcoholates, alkoxy(aryloxy)silanes, organic acids, and amides or salts of metals of Groups I to IV of the periodic table. The salts may be formed in situ by the reaction of organic acids with the organometallic compounds used as the catalyst component (B).

Specific examples of these may be selected from the examples of the electron donor contained in the titanium catalyst component (A). Good results are obtained when organic acid esters, alkoxy (aryloxy) silane compounds, ethers, ketones, acid anhydrides, amines, etc. are used. In particular, when the electron donor in the titanium catalyst component (A) is a monocarboxylic acid ester, the electron donor as component (C) of the catalyst is desirably an alkyl ester of an aromatic carboxylic acid.

When the electron donor in the titanium catalyst component (A) is an ester of a dicarboxylic acid with an alcohol having at least 2 carbon atoms as exemplified hereinabove, it is preferred to use an alkoxy(aryloxy)silane compounds of the general formula $R_nSi(OR^1)_{4-n}$ (wherein R and $R^1$ represent a hydrocarbon group, and $0\leq n<4$), or an amine having a great steric hindrance. Specific examples of the alkoxy(aryloxy)silane compound are trimethylmethoxysilane, trimethylethoxysilane, dimethyldimethoxysilane, dimethyldiethoxysilane, diisopropyldimethoxysilane, t-butylmethyldimethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldiethoxysilane, bisethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, gamma-chloropropyltrimethoxysilane, methyltriethoxysilane, ethyltriethoxysilane, vinyltriethoxysilane, t-butyltriethoxysilane, n-butyltriethoxysilane, iso-butyltriethoxysilane, phenyltriethoxysilane, gamma-aminopropyltriethoxysilane, chlorotriethoxysilane, ethyltriisopropoxysilane, vinyltributoxysilane, cyclohexyltrimethoxysilane, cyclohexyltriethoxysilane, 2-norbornanetrimethoxysilane, 2-norbornanetriethoxysilane, 2-norbornanemethyldimethoxysilane, ethyl silicate, butyl silicate, trimethylphenoxysilane, methyltriallyloxysilane, vinyltris(beta-methoxyethoxysilane), vinyltriacetoxysilane and dimethyltetraethoxydisiloxane. Preferred among these are ethyltriethoxysilane, n-propyltriethoxysilane, t-butyltriethoxysilane, vinyltriethoxysilane, phenyltriethoxysilane, vinyltributoxysilane, diphenyldimethoxysilane, phenylmethyldimethoxysilane, bis-p-tolyldimethoxysilane, p-tolylmethyldimethoxysilane, dicyclohexyldimethoxysilane, cyclohexylmethyldimethoxysilane, 2-norbornanetriethoxysilane, 2-norbornanemethyldimethoxysilane, diphenyldiethoxysilane and ethyl silicate.

Examples of the amine having great steric hindrance preferably include 2,2,6,6-tetramethylpiperidine, 2,2,5,5-tetramethylpyrrolidine, derivatives of these compounds, and tetramethylmethyleneidamine. Of these compounds, the alkoxy(aryloxy)silane compounds are especially preferred as the electron donor used as the component (C) of the catalyst.

Prepolymerization

The prepolymerization is carried out in the presence of at least the titanium catalyst component (A) and the organometallic compound (B) with or without the electron donor (C). The amount of the electron donor (C) is 0.1 to 200 moles, preferably 0.1 to 30 moles, more preferably 0.5 to 10 moles, especially preferably 1 to 5 moles, per gram-atom of Ti in the titanium catalyst component (A). An alpha-olefin having 2 to 10 carbon atoms is prepolymerized in the presence of the above catalyst with or without an inert hydrocarbon solvent or a liquid monomer as a solvent.

The amount of the alpha-olefin polymerized in the prepolymerization is 1 to 2,000 g, preferably 3 to 1,000 g, more preferably 10 to 500 g, per gram of the titanium catalyst component (A).

Examples of the inert hydrocarbon solvent used in the prepolymerization are aliphatic hydrocarbons such as propane, butane, n-pentane, isopentane, n-hexane, isohexane, n-heptane, n-octane, isooctane, n-decane, n-dodecane and kerosene, alicyclic hydrocarbons such as cyclopentane, methylcyclopentane, cyclohexane and methylcyclohexane, aromatic hydrocarbons such as benzene, toluene and xylene, and halogenated hydrocarbons such as methylene chloride, ethyl chloride, ethylene chloride and chlorobenzene. Among them, aliphaic hydrocarbons having 4 to 10 carbon atoms are preferred.

When the inert solvent or liquid monomer is used in the pre-polymerization, it is preferred to use 0.001 to 500 millimoles, especially 0.005 to 100 millimoles, of the titanium catalsyt component (A) as Ti per liter of the solvent. Preferably, the organoaluminum compound (B) is used in such a proportion that the Al/Ti atomic ratio is from 0.5 to 1,000, preferably from 1.0 to 200, more preferably from 2.0 to 50.

Preferred olefins used in the prepolymerization are those having not more than 10 carbon atoms, particularly 3 to 6 carbon atoms, such as ethylene, propylene, 1-butene, 1-pentene, 4-methyl-1-pentene, 3-methyl-1-pentene, 1-heptene, 1-octene and 1-decene. Propylene is especially preferred. These alpha-olefins may be homopolymerized, or copolymerized so long as crystalline polymers are formed, in the prepolymerization.

The temperature in the prepolymerization differs depending upon the type of the alpha-olefin or the inert solvent used, and cannot be defined definitely. Generally, it is about $-40°$ to $80°$ C., preferably about $-20°$ to $40°$ C., more preferably about $-10°$ to $30°$ C. For example, the pre-polymerization temperature is about $-40°$ to $70°$ C. for propylene, about $-40°$ to $40°$ C. for 1-butene, and about $-40°$ to $70°$ C. for 4-methyl-1-pentene or 3-methyl-1-pentene. The prepolymerization may be carried out in the presence of hydrogen.

Polymerization (1)

In the suspension polymerization step (1), propylene, ethylene and an alpha-olefin having 4 to 20 carbon atoms are copolymerized using the resulting alpha-olefin prepolymerization product of the catalyst. Examples of the alpha-olefin having 4 to 20 carbon atoms are propylene, 1-butene, 1-pentene, 1-hexene, 4-methyl1-pentene, 3-methyl-1-pentene, 1-heptene, 1-octent, 1-decene, 1-dodecene, 1-tetradecene and 1-octadecene. Alpha-olfins having 4 to 10 carbon atoms, especially to 6 carbon atoms, are preferred. In the suspension polymerization step, propylene as the monomer is used as a reaction medium. In the suspension polymerization (1), about 0.0001 to about 1 millimoles, as titanium atom, of the titanium catalyst component (A), about 0.001 to about 100 millimoles as the metallic atom of the catalyst component (B), and about 0.001 to about 100 millimoles of the catalyst component (C) are used per liter of the liquid phase. Desirably, the proportion of the metallic atom in the catalyst component (B) is about 1 to about 1000 moles, preferably about 1 to about 300 moles, per mole of the titanium atom in the catalyst component (A). The proportion of the catalyst component (C) is usually 0.01 to 10 moles, preferably 0.1 to 5.0 moles, especially preferably 0.2 to 2.0 moles, per metal atom of Groups I to III in the periodic table in the catalyst component (B).

The polymerization temperature is from room temperature to about $90°$ C., preferably about 50 to about $80°$ C. There is no particular restriction on the polymerization pressure. It is usually atmospheric pressure to about 50 kg/cm$^2$, preferably atmospheric pressure to 40 kg/cm$^2$.

Hydrogen may be used in the polymerization as a molecular weight controlling agent for the desired copolymer.

In the flushing step (2), the unreacted liquid materials, i.e., the unreacted propylene and $C_4$–$C_{20}$ alpha-olefin, are removed from the suspension polymerization product by flushing. The flushing step is carried out at a temperature of 20° to 200° C., preferably 40° to 150° C., more preferably 50° to 100° C., for a period of 1 minute to 3 hours, preferably 5 minutes to 2 hours, more preferably 10 minutes to 1 hour. The flushing step may be carried out by an ordinary method.

A combination of the suspension polymerization step (1) and the flushing step (2) in the process of this invention gives a propylene random copolymer [I] composed of 86 to 97 mole %, preferably 88 to 96 mole %, more preferably 89 to 95 mole %, of recurring units (a) derived from propylene (the propylene component), 0.5 to 6 mole %, preferably 1 to 5 mole %, more preferably 1.5 to 4 mole %, of recurring units (b) derived from ethylene (the ethylene content), and 2 to 13 mole %, preferably 3 to 11 mole %, more preferably 4 to 9 mole %, especially preferably 4 to 7 mole %, of recurring units (c) derived from the $C_4$–$C_{20}$ alpha-olefin (the alpha-olefin component). The mole ratio of c/(b+c) in the copolymer is from 0.3 to 0.9, preferably from 0.4 to 0.8, more preferably from 0.5 to 0.8. To form this propylene random copolymer, the proportions of the starting materials fed in the suspension polymerization step are adjusted to 70 to 98 mole %, preferably 75 to 95 mole %, more preferably 80 to 92 mole %, for propylene, 0.1 to 5 mole %, preferably 0.2 to 4 mole %, more preferably 0.3 to 3 mole %, for ethylene, and 4 to 40 mole %, preferably 8 to 30 mole %, more preferably 12 to 25 mole %, for the $C_4$–$C_{20}$ alpha-olefin, although they may slightly vary depending upon the polymerization conditions and the type of the alpha-olefin.

The propylene random copolymer [I] obtained in the flushing step (2) following the suspension polymerization step (1) has an intrinsic viscosity [η], measured in decalin at 135° C., of 0.5 to 6 dl/g, preferably 1 to 5 dl/g. The above range of the intrinsic viscosity of the copolymer [I] is suitable in view of reducing the thickness of a heat-seal layer in a composite polypropylene laminated structure obtained by laminating the resulting low-crystalline propylene random copolymer composition to a crystalline polypropylene substrate and of the heat seal strength of the laminated structure and the rise of the heat-sealable temperature of the laminated structure by heat-treatment.

The propylene random copolymer [I] has a melting point [Tm], measured by a differential scanning calorimeter, of 115° C. to 145° C., preferably 120° to 140° C., more preferably 120° to 135° C. The range of the DSC melting point of the propylene random copolymer [I] is suitable in view of the heat sealing temperature, heat seal strength, antiblocking property and scratch resistance of a composite polypropylene laminated structure obtained by laminating the resulting low-crystalline propylene random copolymer composition, and the rise of the heat-sealable temperature of the laminated structure by heat-treatment. The DSC melting point is measured as described hereinabove.

The propylene random copolymer [I] has a crystallinity, measured by X-ray diffractometry, of 30 to 60%, preferably 35 to 55%. The above range of the crystallinity of the propylene random copolymer [I] is suitable in view of the heat-sealing temperature, heatseal strength, antiblocking property and scratch resistance of a composite polypropylene laminated structure obtained by laminating the resulting low-crystalline propylene random copolymer composition, and the rise of the heat-sealable temperature of the laminated structure by heat-treatment. The crystallinity is measured by the method described above.

The n-decane-soluble content ($W_1$, wt. %) of the propylene random copolymer [I] at 25° C. is defined by the following general formula in relation to the melting point Tm of the copolymer.

$$0.03(165 - Tm) \leq W_1 \leq 0.20 (165 - Tm),$$

preferably $$0.03(165 - Tm) \leq W_1 \leq 0.15 (165 - Tm)$$

wherein Tm is the dimensionless number of the melting point of the copolymer.

If the n-decane-soluble content is larger than the specified limit, the antiblocking property of the laminated structure containing the low-crystalline propylene random copolymer composition is reduced.

The n-decane-soluble content of the propylene random copolymer [I] at 25° C. is measured and determined by the method described hereinabove.

In the vapor-phase polymerization step (3) in the process of this invention, propylene and an alpha-olefin having 4 to 10 carbon atoms are copolymerized in the presence of the propylene random copolymer [I] obtained in the flushing step (2), preferably in a powdery form, under such conditions that propylene and the alpha-olefin form a vapor phase. A gaseous mixture composed of propylene and the $C_4$–$C_{10}$ alpha-olefin is copolymerized in an amount of 100 to 100,000 g, preferably 500 to 50,000 g, more preferably 1,000 to 10,000 g, per gram of the titanium catalyst component (A) subjected to prepolymerization of the alpha olefin. In the vapor-phase polymerization step, it is necessary to copolymerize the monomers in the vapor phase. The reason is as follows.

In polymerization using a hydrocarbon solvent, the propylene/alpha-olefin random copolymer easily dissolves in the hydrocarbon solvent, and the heat-sealability of the resulting propylene random copolymer composition cannot be fully improved. Furthermore, the viscosity of the hydrocarbon solvent increases to make it difficult to perform the polymerization operation stably.

Among the $C_4$–$C_{20}$ alpha-olefins, those having not more than 18 carbon atoms, such as 1-butene, 1-pentene, 1-hexene, 4-methyl-1-pentene, 1-heptene, 1-octene, 1-decene, 1-dodecene, 1-tetradecene and 1-octadecene are preferred. Those having 4 to 8 carbon atoms are especially preferred. The copolymerization is carried out such that the amount of the polymer produced in the polymerization stage is usually at least 100 times, preferably at least 500 times, more preferably at least 1000 times, the amount of the alpha-olefin prepolymerized.

This vapor-phase polymerization step (3) gives as propylene/alpha-olefin random copolymer (low-crystalline propylene random copolymer [II]) containing 10 to 90 mole %, preferably 80 to 85 mole %, more preferably 50 to 30 mole %, of recurring units (d) derived from propylene (propylene component) and 10 to 90 mole %, preferably 15 to 70 mole %, more preferably 20 to 50 mole %, of recurring ring units (e) derived from alpha-olefin (alpha-olefin component). The proportion of the propylene/alpha-olefin random copolymer [II] in the entire low-crystalline propylene random copolymer composition is 5 to 40% by weight, preferably 8 to 30% by weight, more preferably 12 to 25% by weight.

The polymerization temperature is 20° to 150° C., preferably 30° to 100° C., more preferably 40° to 80° C., under such conditions that the monomers form a vapor-phase. There is no particular restriction on the polymerization pressure so long as the monomers are in the vapor phase at the temperature used. Generally, it is 2 to 50 kg/cm², preferably 8 to 40 kg/cm², more preferably 4 to 30 kg/cm².

It should be understood that in the vapor-phase polymerization step (3) in the process of this invention, polymerization conditions under which monomers such as propylene or the alpha-olefin are partly liquefied are not excluded.

The resulting propylene random copolymer composition as a whole is composed of usually 75 to 96 mole %, preferably 80 to 94 mole %, especially preferably 84 to 92 mole %, of recurring units (f) derived from propylene, usually 0.3 to 5 mole %, preferably 0.7 to 4.5 mole %, especially preferably 1 to 4 mole %, of recurring units (g) derived from ethylene, and usually 4 to 20 mole %, preferably 5 to 15 mole %, especially preferably 7 to 12 mole %, of recurring units (h) derived from an alpha-olefin containing 4 to 20 carbon atoms; and has an intrinsic viscosity [$\eta$], measured in decalin at 135° C., of usually 0.5 to 6 dl/g, preferably 1 to 5 dl/g.

The resulting propylene random copolymer composition has a crystallinity, measured by X-ray diffractometry, of usually 25 to 60%, preferably 30 to 55%, more preferably 35 to 50%. This characteristic value is a measure of excellent tensile properties, and in combination with the other characteristic values, contributes to the aforesaid excellent properties of the low-crystalline random propylene copolymer composition of this invention.

The propylene random copolymer composition obtained by the process of this invention has a p-xylene-soluble content at 25° C. of usually not more than 30% by weight, preferably not more than 25% by weight, and an n-hexane-extracted content at 50° C. of usually not more than 10% by weight, preferably not more than 8% by weight, more preferably not more than 6% by weight.

Polymerization (2)

In another embodiment of the process of this invention, propylene, ethylene and an alpha-olefin having 4 to 20 carbon atoms are copolymerized in the presence of at least the aforesaid alpha-olefin prepolymerized product as a catalyst in a first vapor-phase polymerization step (a). Examples of the alpha-olefin having 4 to 20 carbon atoms are 1-butene, 1-pentene, 1-hexene, 4-methyl-1-pentene, 3-methyl-1-pentene, 1-heptene, 1-octene, 1-decene, 1-dodecene, 1-tetradecene and 1-octadecene. 1-Butene is especially preferred. Of these, alpha-olefins having 4 to 10 carbon atoms are preferred. Those having 4 to 6 carbon atoms are more preferred, and butene-1 is especially preferred.

In this step, about 0.0001 to about 1 millimoles, as titanium atom, of the titanium catalyst component (A), about 0.001 to about 100 millimoles as the metallic atom of the catalyst component (B), and about 0.001 to about 100 millimoles of the catalsyt component (c) are used per liter of the volume of the reaction zone. Desirably, the proportion of the metallic atom in the catalyst component (B) is about 1 to about 1000 moles, preferably about 1 to about 300 moles, per mole of the titanium atom in the catalyst component (A). The proportion of the catalyst component (C) is usually 0.01 to 10 moles, preferably 0.1 to 5.0 moles, especially preferably 0.2 to 2.0 moles, per metal atom of Groups I to III in the periodic table in the catalyst component (B).

The polymerization temperature is from room temperature to about 100° C., preferably about 40° to about 90° C. There is no particular restriction on the polymerization pressure. It is usually atmospheric pressure to about 50 kg/cm², preferably atmospheric pressure to 40 kg/cm². An inert gas capable of creating a gaseous state in the polymerization system, such as methane, ethane, propane, butane or nitrogen, may be supplied to the polymerization system as required. To increase activity, it is preferred to introduce a compound capable of providing moderate moisture in the polymerization system, such as penatane, hexane or octane.

Hydrogen may be used in the polymerization as a molecular weight controlling agent for the desired copolymer.

The first-stage vapor-phase polymerization step (a) gives a propylene random copolymer [I] composed of 86 to 97 mole %, preferably 88 to 96 mole %, more preferably 89 to 95 mole %, of recurring units (a) derived from propylene (propylene component), 0.5 to 6 mole %, preferably 1 to 5 mole %, preferably 1.5 to 4 mole %, of recurring units (b) derived from ethylene (ethylene content), and 2 to 13 mole %, preferably 3 to 11 mole %, more preferably 4 to 9 mole %, especially preferably 4 to 8 mole %, of recurring units (c) derived from butene-1, and the mole ratio c/(b+c) is from 0.3 to 0.9, preferably from 0.4 to 0.8, more preferably from 0.5 to 0.8.

The propylene random copolymer [I] obtained in the first vapor-phase polymerization step (a) has an intrinsic viscosity [$\eta$], measured in decalin at 135° C., of 0.5 to 6 dl/g, preferably 1 to 5 dl/g. The above range of the intrinsic viscosity of the copolymer [I] is suitable in view of reducing the thickness of a heat-seal layer in a composite polypropylene laminated structure obtained by laminating the resulting low-crystalline propylene random copolymer composition to a crystalline polypropylene substrate and of the heat seal strength of the laminated structure and the rise of the heat-sealable temperature of the laminated structure by heat-treatment.

The propylene random copolymer [I] has a melting point [Tm], measured by a differential scanning calorimeter, of 115° C. to 145° C., preferably 120° to 140° C., more preferably 120° to 135° C. The range of the DSC melting point of the propylene random copolymer [I] is suitable in view of the heat sealing temperature, heat seal strength, antiblocking property and scratch resistance of a composite polypropylene laminated structure obtained by laminating the resulting low-crystalline propylene random copolymer composition, and the rise of the heat-sealable temperature of the laminated structure by heat-treatment. The DSC melting point is measured as described hereinabove.

The propylene random copolymer [I] has a crystallinity, measured by X-ray diffractometry, of 30 to 60%, preferably 35 to 55%. The above range of the crystallinity of the propylene random copolymer [I] is suitable in view of the heat-sealing temperature, heat-seal strength, antiblocking property and scratch resistance of a composite polypropylene laminated structure obtained by laminating the resulting low-crystalline propylene random copolymer composition, and the rise of the heat-sealable temperature of the laminated structure by heat treatment. The crystallinity is measured by the method described above.

The n-decane-soluble content ($W_1$, wt. %) of the propylene random copolymer [I] at 25° C. is defined by the following general formula in relation to the melting point Tm of the copolymer.

$$0.03(165-Tm) \leq W_1 \leq 0.20 (165-Tm), \text{ preferably}$$

$$0.03(165-Tm) \leq W_1 \leq 0.15 (165-Tm)$$

wherein Tm is the dimensionless number of the melting point of the copolymer.

If the n-decane-soluble content is larger than the specified limit, the antiblocking property of the laminated structure containing the low-crystalline propylene random copolymer composition is reduced.

In a second-stage vapor-phase polymerization step (b), at least propylene and an alpha-olefin having 4 to 20 carbon atoms are polymerized in the presence of the powdery propylene random copolymer [I] obtained in the first-stage vapor-phase polymerization step (a) under such conditions that propylene and the alpha-olefin form a vapor phase. In this step, a gaseous mixture of at least propylene and the alpha-olefin is copolymerized in an amount of 100 to 100,000 g, preferably 500 to 50,000 g, more preferably 1,000 to 10,000, per gram of the titanium catalyst component (A) in the alpha-olefin prepolymerized catalyst. In this step, the monomers should be copolymerized in the vapor phase. The reasons is as follows.

In polymerization using a hydrocarbon solvent, the polylene/alpha-olefin copolymer easily dissolves in the hydrocarbon solvent, and the heat-sealability of the resulting propylene random copolymer composition and its ability to provide heat seals cannot be fully improved. Furthermore, the viscosity of the hydrocarbon solvent increases to make it difficult to perform the polymerization operation stably.

Examples of the alpha-olefin having 4 to 20 carbon atoms are 1-butene, 1-pentene, 1-hexene, 4-methyl-1-pentene, 3-methyl-1-pentene, 1-heptene, 1-octene, 1-decene, 1-dodecene, 1-tetradecene and 1-octadecene. Of these, alpha-olefins having 4 to 10 carbon atoms are preferred. Those having 4 to 6 carbon atoms are more preferred, and butene-1 is especially preferred.

The copolymerization is carried out such that the amount of the polymer produced in the polymerization stage is usually at least 100 times, preferably at least 500 times, more preferably at least 1000 times, the amount of the alpha-olefin prepolymerized.

This second-stage vapor-phase polymerization step (b) gives a propylene/alpha-olefin random copolymer (low-crystalline propylene random copolymer [II]), containing 10 to 90 mole %, preferably 80 to 85 mole %, more preferably 50 to 80 mole %, of recurring units (d) derived from propylene (propylene component) and 10 to 90 mole %, preferably 15 to 70 mole %, more preferably 20 to 50 mole %, of recurring units (e) derived from the alpha-olefin having 4 to 20 carbon atoms (alpha-olefin component). The proportion of the propylene/alpha-olefin random copolymer [II] in the entire low-crystalline propylene random copolymer composition is 5 to 40% by weight, preferably 8 to 35% by weight, more preferably 12 to 30% by weight.

When propylene, ethylene and the $C_4$–$C_{20}$ alpha-olefin are random-copolymerized in the first vapor-phase polymerization step (a) and propylene and the $C_4$–$C_{20}$ alpha-olefin are random copolymerized in the second-stage vapor-phase polymerization step (b), the content (mole %) of the alpha-olefin in the propylene/alpha-olefin copolymer [II] formed in the second-stage vapor-phase polymerization step (b) is determined by the following method. Let the proportions of ethylene, propylene and the $C_4$–$C_{20}$ alpha-olefin in the copolymer [I] before the second-stage vapor-phase polymerization step (b) be a mole %, b mole % and c mole % respectively, the $C_4$–$C_{20}$ alpha-olefin content in the copolymer composition after the second-stage vapor-phase polymerization step (b) be a mole %, b mole % and c mole % respectively, the $C_4$–$C_{20}$ alpha-olefin content in the copolymer composition after the second-stage vapor-phase polymerization step (b) be d mole %, and the proportion of the $C_4$–$C_{20}$ alpha-olefin fed in the second-stage vapor-phase polymerization step (b) be w weight %, then the $C_4$–$C_{20}$ alpha-olefin (e.g., 1-butene) content (mole %) in the propylene/alpha-olefin copolymer [II] formed in the second-stage vapor-phase polymerization step (b) is expressed by $$\frac{300(100 - w)(c - d) - dw(2a + 3b + 4c)}{(100 - w)(d - c) - w(2a + 3b + 4c)}$$

The polymerization temperature is 20° to 150° C., preferably 30° to 100° C., more preferably 40° to 80° C., under conditions such that the monomers are gaseous. The polymerization pressure is not particularly limited so long as the monomers are gaseous at the temperature used. Generally it is 2 to 50 kg/cm², preferably 3 to 40 kg/cm², more preferably 4 to 30 kg/cm².

It should be understood that in the vapor-phase polymerization step in the process of this invention, polymerization conditions under which monomers such as propylene or the alpha-olefin are partly liquefied are not excluded.

The resulting propylene random copolymer composition as a whole is composed of usually 75 to 96 mole %, preferably 80 to 94 mole %, especially preferably 84 to 92 mole %, of recurring units (f) derived from propylene, usually 0.3 to 5 mole %, preferably 0.7 to 4.5 mole %, especially preferably 1 to 4 mole %, of recurring units (g) derived from ethylene, and usually 4 to 20 mole %, preferably 5 to 15 mole %, especially preferably 7 to 12 mole %, of recurring units (h) derived from the $C_4$–$C_{20}$ alpha-olefin; and has an intrinsic viscosity [$\eta$], measured in decalin at 135° C., of usually 0.5 to 6 dl/g, preferably 1 to 5 dl/g.

The resulting propylene random copolymer composition has a crystallinity, measured by X-ray diffractometry, of usually 25 to 60%, preferably 30 to 55%, more preferably 35 to 50%. This characteristic value is a measure of excellent tensile properties, and in combination with the other characteristic values, contributes to the aforesaid excellent properties of the low-crystalline random propylene copolymer composition of this invention.

The propylene random copolymer composition obtained by the process of this invention has a p-xylene-soluble content at 25° C. of usually not more than 30% by weight, preferably not more than 25% by weight, and an n-hexane-extracted content at 50° C. of usually not more than 10% by weight, preferably not more than 8% by weight, more preferably not more than 6% by weight.

The low-crystalline propylene random copolymer composition of this invention may be easily produced by previously selecting and determining the catalyst and polymerization conditions experimentally so that the characteristics (A) to (E) and the characteristic values (i) to (v) described in detail hereinabove are met.

The low-crystalline propylene random copolymer composition of this invention may be composed only of the propylene random copolymer [I] and the low-crystalline propylene random copolymer [II], or may further comprise another polymer or copolymer. The copolymer composition of this invention may contain additives such as heat stabilizers, weatherability stabilizers, nucleating agents, lubricants, slip agents, antistatic agents, antiblocking agents, antihaze agents, pigments, and dyes. The proportions of the additives may be those which do not mar the low-temperature heat-sealability and heat seal strength of a composite polypropylene laminated structure containing the copolymer composition of this invention.

III. Composite polypropylene laminated structure

The composite polypropylene laminated structure of this invention is composed of a substrate layer of crystalline polypropylene and a layer of the low-crystalline propylene random copolymer composition laminated to one or both surfaces of the substrate layer. It may be of any form, such as a laminated film, a laminated sheet, a laminated pack, a laminated container, or any other shaped article of various shapes imparting heat sealability.

The substrate layer of crystalline polypropylene constituting the composite laminated structure in this invention may be non-stretched, monoaxially stretched, or biaxially stretched. The layer composed of the low-crystalline propylene random copolymer composition may also be non-stretched, monoaxially stretched or biaxially stretched. Hence, the state of the substrate layer and the state of the layer of the low-crystalline copolymer composition in the composite laminated structure may be in any combination of the aforesaid states.

The thickness of the substrate layer composed of crystalline polypropylene constituting the composite polypropylene laminated structure is not particularly limited. The thickness of the heat-seal layer composed of the low-crystalline propylene random copolymer composition is generally 0.1 to 50 microns, preferably 0.5 to 30 microns. When the laminated structure is a laminated film or a laminated sheet, the thickness of the substrate layer of crystalline polypropylene is 5 to 200 microns, preferably 10 to 70 microns, and the thickness of the heat-seal layer of the low-crystalline propylene copolymer composition is usually 0.1 to 50 microns, preferably 0.5 to 30 microns.

The laminated structure is formed by laminating the low-crystalline propylene random copolymer composition to one or both surfaces of a substrate layer composed of crystalline polypropylene. The crystalline polypropylene as the substrate may, for example, be a crystalline homopolymer of propylene or a crystalline random copolymer of a major proportion of propyelne and a minor proportion of an alpha-olefin, such as a propylene/ethylene random copolymer having an ethylene content of 0.1 to 8 mole %, a propylene/ethylene/1-butene random copolymer having an ethylene content of 0.1 to 5 mole % and a 1-butene content of 0.1 to 8 mole %, or a propylene/1-butene copolymer having a 1-butene content of 0.1 to 10 mole %. The crystalline polypropylene has an intrinsic viscosity [$\eta$], measured in decalin at 35° C., of usually 1.5 to 4 dl/g, preferably 1.7 to 3.5 dl/g, and a crystallinity, measured by X-ray diffractometry, of usually 50 to 70%, preferably 55 to 70%.

The following methods may, for example, be used to produce the composite polypropylene laminated structure of the invention.

(1) The substrate of crystalline polypropylene and the low-crystalline propylene random copolymer composition are co-extruded to form a laminated structure which, as required, may be longitudinally stretched and/or transversely stretched either separately or simultaneously.

(2) The low-crystalline propylene random copolymer composition was extruded in the molten state and thus laminated onto the surface of the crystalline polypropylene substrate which is either non-stretched, monoaxially stretched or biaxially stretched. If the substrate is non-stretched, the laminated structure may be monoaxially or biaxially stretched as desired. When the substrate is monoaxially stretched, the laminated structure may, as required, be further stretched in the same direction as the substrate or in a direction crossing it.

(3) A film of the low-crystalline propylene random copolymer is laminated to the surface of the crystalline polypropylene substrate by means of an adhesive.

The low-crystalline propylene random copolymer composition constituting the laminated structure of the invention comprises the propylene random copolymer [I] and the low-crystalline alpha-olefin random copolymer [II] described hereinabove, particularly in section I.

EFFECTS AND ADVANTAGES OF THE INVENTION

The present invention can give a propylene random copolymer composition having better heat-sealability, transparency and antiblocking property, and containing a smaller amount of a hydrocarbon-soluble portion, than presently known propylene random copolymers.

The propylene random copolymer composition of this invention has heat-sealability, antiblocking property and heat seal strength retention comparable to presently known polyolefin compositions. Hence, it does not have to be formulated into a composition with another polymer or copolymer, and the cost of production can be curtailed.

According to this invention, a low-melting polypropylene copolymer composition can be obtained in great amounts per unit weight of the titanium catalyst component and in high yields while the amount of a by-product soluble copolymer is reduced. The copolymerization can be carried out by suspension polymerization without any trouble. Furthermore, since the amount of the copolymer composition yielded per unit amount of titanium is large, the operation of removing the catalyst after the polymerization can be omitted.

Because of the aforesaid excellent properties, the copolymer composition obtained by this invention is suitably used, for example, as a film, particularly a packaging film such as a shrinkable film for use in food packaging, and also as a hollow bottle.

The composite polypropylene laminated structure of the invention produced by laminating a layer of the low-crystalline propylene random copolymer composition to one or both surfaces of a substrate of crystalline polypropylene has excellent low-temperature heat-sealability and heat seal strength and a broadened range of temperatures at which heat sealing is possible, and moreover has excellent scratch resistance and antiblocking property. By utilizing these properties, the laminated structure of the invention is suitably used for food packaging, apparel packaging, and packaging of other daily goods and sundries.

EXAMPLES

The following Examples illustrate the present invention more specifically.

In Examples 1 to 13, the antiblocking properties and complete heat sealing temperatures were measured by the following method.

Film Preparation

A 0.1 mm thick aluminum sheet, a polyester sheet (Lumilar, a tradename of Toray Inc.) and a polyimide resin (Kapton, a tradename for a product of Du Pont) sheet having a thickness of 50 microns with its central 15 cm×15 cm square portion being cut off were placed on a press sheet in this order, and 0.8 g of a sample is placed in the central cut-off portion. Then, a Lumilar sheet, an aluminum sheet and a press plate were further stacked in this order (see FIG. 1).

The sample interposed between the press plates was put in a hot press at 200° C., and pre-heated for about 5 minutes. To remove bubbles in the sample, a pressuring (20 kg/cm$^2$-G)/pressure releasing operation was repeated three times. Finally, the pressure was raised to 150 kg/cm$^2$-G, and the assembly was heated under pressure for 5 minutes After releasing the pressure, the assembly was taken out from the press, and transferred to another press whose press-bonding portion was maintained at 30° C., and cooled under 100 kg/cm$^2$ for 4 minutes. The pressure was then released, and the sample was taken out. A film having a thickness of 50 to 70 μm among those obtained by the above procedure was used for measurements below.

Antiblocking Test

Figure 2:
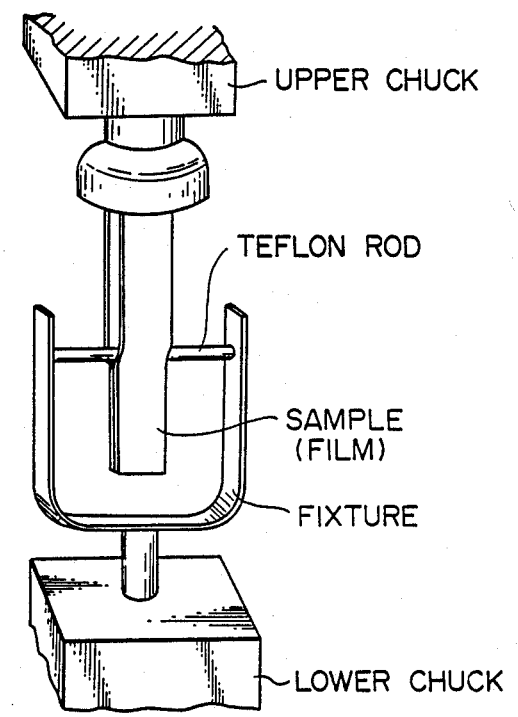

Two films, cut to a size of 6×10 cm, were superimposed and held by two sheets of paper having a uniform thickness and then further held by glass plates having a thickness of about 5 mm. The assembly was placed in a constant temperature vessel at 60° C. for 2 days (aging) under a load of 7 kg. The films were taken out from the constant temperature vessel and cooled to room temperature. Then, part of one end of the films was peeled, and a rod was inserted into the peeled portion. The peeled ends of the films were secured by a clip and fixed to an upper chuck of a tensile tester. At the same time, the Teflon ® rod was fixed to a lower chuck via a fixture (see FIG. 2). The upper chuck was lifted at a speed of 10 cm/min. to peel the two films apart via the Teflon rod. The stress at this time was measured by the tensile tester. The blocking value (g/cm), a measure of antiblocking property, is defined by the quotient of the measured stress value divided by the width (6 cm) of the films used.

Measurement of Heat-Seal Strength

A film prepared by the above method was left to stand (aged) for 2 days in a constant-temperature vessel at 50° C. Paper was applied to both surfaces of the film to avoid contact of the film with itself during aging.

The aged film was cut to rectangular pieces having a width of 15 mm. Two rectangular pieces of the film were superimposed, held by two Teflon films having a thickness of 0.1 mm, and heat-sealed.

Heat sealing was carried out by maintaining the temperature of the lower portion of a hot plate in a heat sealer at 70° C., and varying the temperature of the upper portion of the hot plate at intervals of 5° C. The heat-sealing pressure was 2 kg/cm², and the heat-sealing time was 1 second. The seal width was 5 cm (therefore, the seal area was 15 mm×5 mm).

Figure 3:
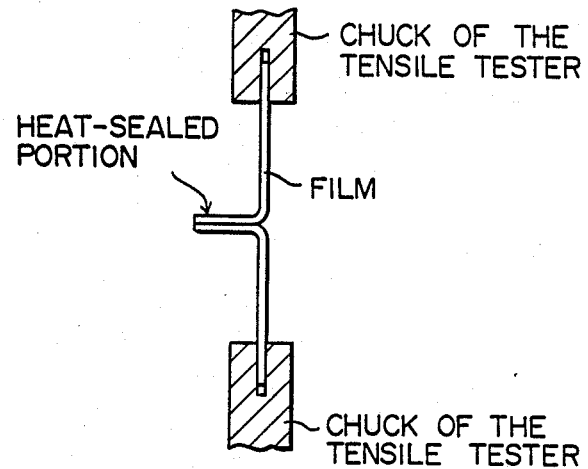

The heat seal strength was the peel strength of the film heat-sealed at each of the heat-sealing temperatures, which was measured by a tensile tester at a pulling speed of 30 cm/min (see FIG. 3).

Figure 4:
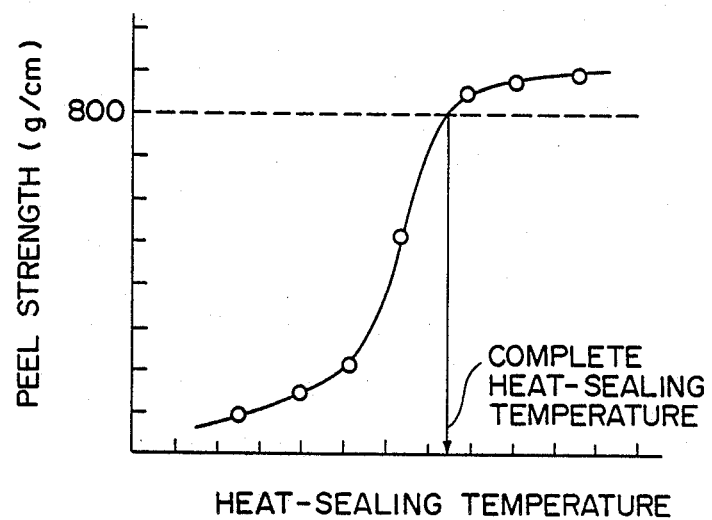

The peel strengths at the heat-sealing temperatures were measured, and plotted against the heat-sealing temperatures. From the resulting curve, a heat seal temperature at which the peel strength was 800 g/15 cm was determined, and defined as the complete heat-sealing temperature (see FIG. 4).

In Examples 14 to 17 and Comparative Example 1, the various properties were measured by the following methods.

(1) Haze

Measured in accordance with ASTM D1003.

(2) Heat Seal Strength

A composite polypropylene film composed of a substrate of crystalline polypropylene and the low-crystalline propylene copolymer composition laminated to the substrate was used as a sample. That surface of the composite film to which the low-crystalline propylene copolymer composition was laminated was laid over each other, heat-sealed under a pressure of 2 kg/cm² at each of predetermined temperatures for 1 second by means of a seal bar having a width of 5 mm, and then allowed to cool. A test piece having a width of 15 mm was cut out from the sample. The strength required to peel the heat-sealed portion at a crosshead speed of 200 mm/min. was measured, and defined as the heat seal strength.

Heat-sealing of the film and measurement of the heat seal strength of the film were repeated after the composite polypropylene film was left to stand for one week in air atmosphere at 50° C. The peel strength measured was defined as the heat seal strength after heat-treatment.

(3) Antiblocking Property

Evaluated in accordance with ASTM D1893. The composite polypropylene film was cut out in a size of 10 cm in width and 15 cm in length. That surface of the film to which the low-crystalline propylene copolymer composition was laminated was laid over each other, held by two glass plates, and left to stand in an air oven at 50° C. while a load of 10 kg was placed on the assembly. One day later, the sample was taken out, and its peel strength was measured by a universal tester, and the peel strength per cm was defined as the blocking value.

(4) Slip Property

A film prepared in accordance with ASTM D1894 was aged in an air oven at 40° C. The coefficient of static friction and the coefficient of dynamic friction of the film were measured before aging and 1 day and 7 days, respectively, after aging.

EXAMPLE 1

Preparation of a Titanium Catalyst Component (A)

Anhydrous magnesium chloride (714 g), 3.7 liters of decane and 3.5 liters of 2-ethylhexyl alcohol were reacted at 130° C. for 2 hours to form a uniform solution. Phthalic anhydride (167 g) was added to the solution, and the mixture was stirred at 130° C. for 1 hour to dissolve phthalic anhydride uniformly in the solution. The uniform solution was cooled to room temperature, and added dropwise over 1 hour to 20 liters of titanium tetrachloride maintained at −20° C. After the addition, the mixture was heated to 110° C. over the course of 4 hours, and when the temperature reached 110° C., 0.4 liter of diisobutyl phthalate was added. The mixture was maintained at this temperature for 2 hours with stirring. After the two-hour reaction, the solid portion was collected by hot filtration, and suspended in 28 liters of titanium tetrachloride. The suspension was reacted at 110° C. for 2 hours. After the reaction, the solid portion was collected by hot filtration, and washed fully with decane and hexane at 110° C. until no free titanium compound was detected in the washing. The titanium catalyst component so produced was dried by a dryer. The resulting titanium catalyst component contained 2.3% by weight of titanium, 58.0% by weight of chlorine, 18.0% by weight of magnesium and 14.0% by weight of diisobutyl phthalate.

The titanium catalyst component was a granular catalyst component having an average particle diameter of 18 microns and a geometric standard deviation ($\sigma_g$) of its particle size distribution of 1.2.

Prepolymerization

A 2-liter glass reactor equipped with a stirrer was charged in an atmosphere of nitrogen with 1 liter of hexane, 5 millimoles of triethyl aluminum, 1 millimole of diphenyldimethoxysilane and 0.5 millimole, as titanium titanium catalyst component obtained as above. Then, propylene was fed into the mixture in the reactor at a rate of 11.1 Nl/hr for 5 hours. During this time, the temperature was maintained at 20° C. Feeding of propylene was stopped 5 hours after starting, and the inside of the reactor was purged with nitrogen. The stirring was stopped, and the supernatant liquid was removed. One liter of purified hexane was freshly added. This washing operation was repeated three times, and the product was re-slurried in hexane and transferred to a bottle for storing the catalyst. The amount of propylene prepolymerized was 98 g/g of catalyst.

Polymerization

A 50-liter autoclave purged with propylene was charged with 7.5 kg of propylene, 2.3 kg of butene-1 and 38 Nl of ethylene and 25 Nl of hydrogen. Then, the temperature was raised to 50° C., and 25 millimoles of triethyl aluminum, 25 millimoles of diphenyldimethoxysilane and 0.15 millimole, as titanium atom, of the titanium catalyst component subjected to the prepolymerization described above. The monomers were then copolymerized at 60° C. for 15 minutes [suspension-polymerization step (1)].

Then, while maintaining a temperature of 50° C. in the autoclave, the pressure was released until the inside pressure of the autoclave reached 0.1 kg/cm$^2$-G, thereby to remove the unreacted monomers in the autoclave [flushing step (2)].

Thereafter, 5 Nl of hydrogen was added, and a gaseous mixture of propylene and butene-1 in a mole ratio of 30:70 was fed into the autoclave until the inside pressure of the autoclave reached 5.5 kg/cm$^2$-G. Vapor-phase polymerization was started. During the polymerization, the temperature was maintained at 50° C. The propylene/butene-1 gaseous mixture was supplied so as to maintain the pressure at 5.5 kg/cm$^2$-G [vapor-phase polymerization step (3)]. After polymerization for 90 minutes, 5 ml of methanol was added to stop the polymerization. The pressure was released, and the resulting copolymer composition was recovered and dried overnight at 60° C. under a reduced pressure of 300 mmHg. The amount of the resulting white powdery copolymer composition was 3.2 kg. It had an apparent bulk density of 0.34 kg/ml, an ethylene content of 2.3 mole %, a butene-1 content of 9.7 mole %, an MFR of 5.6 dg/min., an n-decane-soluble content of 19.3% by weight, a p-xylene-soluble content at 25° C. of 24.3% by weight, and an n-hexane-extracted content of 4.8% by weight. The antiblocking property of a film prepared from the resulting product by the method described hereinabove had a blocking value of 16 g/cm, and a complete heat sealing temperature of 113° C.

The copolymer obtained after the flushing step (2) had an ethylene content of 2.8 mole % and a butene-1 content of 5.8 mole %. Hence, the mole ratio of butene-1/(butene-1+ethylene) was 0.67. Hence, the copolymer formed in the vapor-phase polymerization step (3) had a butene-1 content of 24 mole %.

EXAMPLE 2

Example 1 was repeated except that the polymerization was carried out under the conditions shown in Table 1. The results are shown in Table 1.

EXAMPLES 3-5

Example 1 was repeated except that each of the electron donors indicated in Table 1 was used instead of diphenyldimethoxysilane, and the polymerization was carried out under the conditions shown in Table 1. The results are shown in Table 1.

EXAMPLE 6

Preparation of a Titanium Catalyst Component (A)

A 2-liter high-speed stirring device (made by Tokushu Kika Kogyo K. K.) was fully purged with N$_2$, and then, charged with 700 ml of purified kerosene, 10 g of commercial MgCl$_2$, 24.2 g of ethanol and 3 g of Emasol 320 (a tradename for sorbitan distearate made by KaoAtlas Co.). These materials were heated with stirring, and stirred at 120° C. for 30 minutes at a speed of 800 rpm. With high-speed stirring, the solution was transferred by means of a Teflon tube having an inside diameter of 5 mm into a 2-liter glass flask equipped with a stirrer which had been filled with 1 liter of purified kerosene cooled to $-10°$ C. The resulting solid was collected by filtration, and washed fully with hexane to form a carrier.

The carrier (7.5 g) was suspended in 150 ml of titanium tetrachloride at room tepperature, and 4.5 ml of di-n-octyl phthalate was added. The mixture was stirred at 120° C. for 2 hours. The solid portion was collected by filtration, and suspended in 150 ml of titanium tetrachloride. The suspension was stirred at 130° C. for 2 hours. The solid reaction product was collected from the reaction mixture and washed with a sufficient amount of purified hexane to obtain a solid catalyst component (A) having a particle diameter of 64 micrometers and a geometric standard deviation of its particle size distribution of 1.4.

Prepolymerization

Using the resulting titanium catalyst component (A), prepolymerization was carried out in the same way as in Example 1. The amount of propylene prepolymerized was 89 g/g of catalyst.

Polymerization

Polymerization was carried out under the conditions shown in Table 1 using the catalsyt subjected to prepolymerization.

TABLE 1

| | Example | | | | | |
|---|---|---|---|---|---|---|
| | 1 | 2 | 3 | 4 | 5 | 6 |
| Polymerization conditions | | | | | | |
| Suspension polymerization step (1) | | | | | | |
| propylene fed (kg) | 7.5 | 7.5 | 7.5 | 7.5 | 7.5 | 7.5 |
| butene-1 fed (kg) | 2.3 | 2.3 | 2.3 | 2.3 | 2.3 | 2.1 |
| ethylene fed (Nl) | 38 | 38 | 38 | 40 | 38 | 38 |
| hydrogen fed (Nl) | 25 | 25 | 25 | 25 | 25 | 25 |
| electron donor fed | diphenyl-dimethoxy-silane | diphenyl-dimethoxy-silane | dicyclo-hexyl-dimethoxy-silane | cyclohexyl-methyl-dimethoxy-silane | t-butyl-methyl-dimethoxy-silane | diphenyl-dimethoxy-silane |
| temperature (°C.) | 60 | 60 | 60 | 60 | 60 | 60 |
| time (min.) | 15 | 15 | 15 | 15 | 15 | 15 |
| Vapor-phase polymerization step (3) | | | | | | |
| propylene/butene-1 (mole ratio) | 30/70 | 30/70 | 25/75 | 30/70 | 30/70 | 20/80 |
| temperature (°C.) | 50 | 60 | 60 | 60 | 60 | 60 |

TABLE 1-continued

|  | Example | | | | | |
|---|---|---|---|---|---|---|
|  | 1 | 2 | 3 | 4 | 5 | 6 |
| time (min.) | 120 | 90 | 90 | 90 | 30 | 50 |
| pressure (kg/cm$^2$-G) | 5.5 | 6 | 9 | 7 | 7 | 6.5 |
| hydrogen (Nl) | 5 | 3 | 5 | 5 | 5 | 1.3 |
| Polymerization results | | | | | | |
| [I] propylene random copolymer | | | | | | |
| propylene component (a) (mole %) | 91.4 | 92.6 | 91.9 | 91.3 | 91.5 | 91.2 |
| ethylene component (b) (mole %) | 2.8 | 1.7 | 2.6 | 3.3 | 2.8 | 2.6 |
| butene-1 component (c) (mole %) | 5.8 | 5.7 | 5.5 | 5.4 | 5.7 | 5.2 |
| c/(b + c) (mole ratio) | 0.67 | 0.73 | 0.68 | 0.62 | 0.67 | 0.67 |
| [$\eta$] (dl/g) | 1.8 | 2.7 | 2.1 | 2.1 | 2.1 | 2.5 |
| DSC melting point (°C.) | 128 | 132 | 129 | 127 | 128 | 130 |
| crystallinity (%) | 43 | 44 | 43 | 43 | 43 | 44 |
| Polymerization conditions | | | | | | |
| [II] low-crystalline propylene random copolymer | | | | | | |
| propylene component (d) (mole %) | 76 | 67 | 64 | 73 | 74 | 56 |
| butene-1 component (e) (mole %) | 24 | 33 | 36 | 27 | 26 | 44 |
| [$\eta$] (dl/g) | 3.1 | 3.5 | 2.1 | 2.7 | 3.2 | 3.2 |
| low-crystalline propylene random copolymer composition | | | | | | |
| [I]/[II] weight ratio | 77/23 | 88/12 | 86/14 | 84/16 | 91/9 | 85/15 |
| propylene component (f) (mole %) | 88.0 | 88.9 | 88.9 | 89.1 | 89.8 | 88.3 |
| ethylene component (g) (mole %) | 2.3 | 1.6 | 1.6 | 2.2 | 2.8 | 1.3 |
| butene-1 component (h) (mole %) | 9.7 | 9.5 | 9.5 | 8.7 | 7.4 | 10.4 |
| [$\eta$] (dl/g) | 2.1 | 2.8 | 2.1 | 2.2 | 2.2 | 2.6 |
| MFR (dg/min.) | 5.6 | 1.5 | 5.7 | 4.9 | 4.4 | 2.0 |
| bulk density (g/ml) | 0.34 | 0.36 | 0.33 | 0.34 | 0.37 | 0.36 |
| crystallinity (%) | 39 | 39 | 41 | 39 | 40 | 39 |
| p-xylene-soluble content (wt. %) | 24.3 | 23.0 | 21.6 | 25.2 | 20.6 | 24.1 |
| n-hexane-extracted content at 50° C. (wt. %) | 4.8 | 4.6 | 4.5 | 4.9 | 4.3 | 5.1 |
| Properties | | | | | | |
| blocking value (g/cm) | 16 | 14 | 13 | 18 | 11 | 19 |
| complete heat-sealing temperature | 113 | 115 | 117 | 115 | 118 | 115 |

EXAMPLE 7

Preparation of a titanium catalyst component (A)

A titanium catalyst component was prepared as in Example 1. The resulting titanium catalyst component (A) contained 2.5% by weight of titanium, 58.0% by weight of chlorine, 18.0% by weight of magnesium and 14.3% by weight of diisobutyl phthalate. It was a granular catalyst component having an average particle diameter of 18 microns and a geometric standard deviation ($\sigma_g$) of its particle size distribution of 1.1.

Prepolymerization

Prepolymerization was carried out in the same way as in Example 1. The amount of propylene prepolymerized was 101 g/g of catalyst.

Polymerization

Sodium chloride (250 g) was added as a catalyst dispersing agent to a 2-liter autoclave fully purged with nitrogen. While the autoclave was heated so that the inside temperature of the autoclave reached at least 100° C., the inside of the autoclave was evacuated by a vacuum pump for 2 hours so that the inside pressure of the autoclave reached 50 mmHg or below. Then, the inside temperature of the autoclave was lowered to 75° C., and the inside of the autoclave was purged with propylene. Then, 2.0 millimoles of triethyl aluminum, 2.0 millimoles of cyclohexylmethyldimethoxysilane and 0.006 millimole, as Ti atom, of the catalyst subjected to prepolymerization were added. Hydrogen (400 N ml) and a gaseous mixture composed of 78.8 mole % of propylene, 6.2 mole % ethylene and 16.3 mole % of butene-1 were introduced into the autoclave. The inside pressure of the autoclave was maintained at 15 kg/cm$^2$-G by adjusting the amount of the gas introduced. Propylene, ethylene and butene-1 were random-copolymerized at 80° C. for 30 minutes [first-stage vapor-phase polymerization step (a)].

Thirty minutes after the start of the polymerization, the introduction of propylene was stopped, and the pressure was released by opening the vent valve of the autoclave. Subsequently, 40 N ml of hydrogen and a gaseous mixture composed of 26 mole % of propylene and 74 mole % of butene-1 were introduced into the autoclave. The monomers were copolymerized at 60°

C. for 90 minutes while the pressure of the inside of the autoclave was maintained at 5.5 kg/cm$^2$-G [second-stage vapor-phase polymerization step (b)].

After the polymerization, the pressure was released, and all the polymer and sodium chloride in the autoclave were taken out, and put into about 1 liter of water. By stirring the mixture for about 5 minutes, nearly all sodium chloride dissolved in water, and the copolymer composition came afloat on the water surface. The copolymer composition was recovered, washed fully with methanol, and dried overnight at 80° C. under reduced pressure.

The polymerization conditions and the results are shown in Table 2.

EXAMPLES 8-9

Example 7 was repeated except that the polymerization was carried out under the conditions shown in Table 2. The results are shown in Table 3.

EXAMPLES 10-11

Example 7 was repeated except that diphenyldimethoxysilane (Example 10) or diisopropyldimethoxysilane (Example 11) was used instead of cyclohexylmethyldimethoxysilane used as the electron donor in Example 7 and the polymerization was carried out under the conditions shown in Table 2. The results are shown in Table 2.

EXAMPLE 12

Preparation of a Titanium Catalyst Component (A)

A titanium catalyst component (A) was prepared in the same way as in Example 6. The resulting titanium catalyst component (A) had a particle diameter of 62 micrometers and a geometrical standard deviation of its particle size distribution of 1.4.

Prepolymerization

Prepolymerization was carried out by the same method as in Example 7. The amount of propylene prepolymerized was 76 g/g of catalyst.

Polymerization

Using the catalyst prepolymerized as above, polymerization was carried out under the conditions shown in Table 2. The results are shown in Table 2.

TABLE 2

| | Example | | | | | |
|---|---|---|---|---|---|---|
| | 7 | 8 | 9 | 10 | 11 | 12 |
| First-stage vapor-phase polymerization step (a) | | | | | | |
| Polymerization conditions | | | | | | |
| temperature (°C.) | 80 | 70 | 80 | 80 | 70 | 80 |
| time (min.) | 30 | 45 | 30 | 30 | 30 | 40 |
| pressure (kg/cm$^2$-G) | 15 | 12 | 15 | 15 | 15 | 17 |
| ethylene fed (mole %) | 6.2 | 5.9 | 5.5 | 6.2 | 6.2 | 6.0 |
| propylene fed (mole %) | 77.5 | 83.4 | 82.5 | 77.5 | 77.5 | 78.5 |
| butene-1 fed (mole %) | 16.3 | 10.7 | 12.0 | 16.3 | 16.3 | 15.5 |
| Amount of H$_2$ added (N ml) | 400 | 350 | 400 | 400 | 400 | 400 |
| Copolymer (I) | | | | | | |
| ethylene component (b) (mole %) | 3.5 | 3.3 | 3.3 | 3.4 | 3.4 | 3.4 |
| propylene component (a) (mole %) | 90.2 | 92.3 | 91.9 | 90.5 | 90.7 | 90.8 |
| butene-1 component (c) (mole %) | 6.3 | 4.4 | 4.8 | 6.1 | 5.9 | 5.8 |
| c/(b + c) mole ratio | 0.64 | 0.57 | 0.59 | 0.64 | 0.63 | 0.63 |
| Tm (°C.) | 120 | 127 | 125 | 121 | 121 | 122 |
| Second-stage vapor-phase polymerization step (b) | | | | | | |
| Polymerization conditions | | | | | | |
| temperature (°C.) | 60 | 50 | 60 | 60 | 60 | 60 |
| time (min.) | 90 | 90 | 60 | 90 | 90 | 100 |
| pressure (kg/cm$^2$-G) | 5.5 | 5.5 | 5.5 | 5.5 | 5.5 | 5.5 |
| propylene fed (mole %) | 26 | 20 | 30 | 26 | 26 | 26 |
| butene-1 fed (mole %) | 74 | 80 | 70 | 74 | 74 | 74 |
| H$_2$ fed (mole %) | 40 | 40 | 40 | 40 | 40 | 40 |
| Copolymer (II) | | | | | | |
| [I]/[II] weight ratio | 72/28 | 78/22 | 74/26 | 69/31 | 72/28 | 71/29 |
| propylene component (d) (mole %) | 75 | 69 | 78 | 73 | 73 | 75 |
| butene-1 component (e) (mole %) | 25 | 31 | 22 | 27 | 27 | 25 |
| Low-crystalline propylene copolymer composition | | | | | | |
| ethylene component (g) (mole %) | 2.6 | 2.6 | 2.5 | 2.4 | 2.5 | 2.4 |
| propylene component (f) (mole %) | 86.2 | 87.6 | 88.5 | 85.4 | 86.0 | 86.5 |
| butene-1 component (h) (mole %) | 11.2 | 9.8 | 9.0 | 12.2 | 11.5 | 11.1 |
| crystallinity (%) | 37 | 38 | 39 | 37 | 38 | 38 |
| [η] (dl/g) | 2.2 | 1.8 | 2.1 | 2.4 | 2.1 | 2.0 |
| p-xylene-soluble content at 25° C. (wt. %) | 25.3 | 23.7 | 23.5 | 27.2 | 25.1 | 24.8 |
| n-hexane-extracted content at 50° C (wt. %) | 5.6 | 4.9 | 4.7 | 5.8 | 5.2 | 5.1 |
| Film properties | | | | | | |

TABLE 2-continued

| | Example | | | | | |
|---|---|---|---|---|---|---|
| | 7 | 8 | 9 | 10 | 11 | 12 |
| blocking value (g/cm²) | 18 | 16 | 15 | 18 | 17 | 17 |
| complete heat-sealing temperature (°C.) | 111 | 113 | 114 | 111 | 112 | 112 |

EXAMPLE 13

Preparation of a titanium catalyst component (A)

A titanium catalyst component (A) was prepared as in Example 1.

Prepolymerization

A 0.5-liter glass reactor equipped with a stirrer was charged in an atmosphere of nitrogen with 0.3 liter of hexane, 25 millimoles of triethyl aluminum, 25 millimoles of diphenyldimethoxysilane and 0.15 millimole, calculated as Ti atom of the titanium catalyst component (A) obtained above. Then, propylene was fed into the mixture in the reactor at a rate of 8.3 Nl/hr for 2 hours. During this time, the temperature was maintained at 20° C. Two hours after the start of feeding propylene, the feeding of propylene was stopped, and the resulting mixed suspension was all used in the following polymerization.

Polymerization

Propylene (7.5 kg), 2.3 kg of butene-1, 38 Nl of ethylene and 25 Nl of hydrogen was introduced into a 50-liter autoclave purged with propylene. Then, the temperature was raised to 50° C., and all the prepolymerization suspension obtained above was added to the autoclave. The monomers were polymerized at 60° C. for 15 minutes [suspension polymerization step (1)]. Thereafter, the flushing step (2) and the vapor-phase polymerization step (3) were carried out in the same way as in Example 1 to obtain a low-crystalline propylene block copolymer composition. The results are shown in Table 3.

TABLE 3

| Polymerization results | |
|---|---|
| [I] crystalline propylene random copolymer | |
| propylene component (a) (mole %) | 91.3 |
| ethylene component (b) (mole %) | 2.9 |
| butene-1 component (c) (mole %) | 5.8 |
| c/(b + c) (mole ratio) | 0.67 |
| [η] (dl/g) | 1.9 |
| DSC melting point (°C.) | 129 |
| crystallinity (%) | 43 |
| [II] low-crystalline propylene random copolymer | |
| propylene component (d) (mole %) | 74 |
| butene-1 component (e) (mole %) | 26 |
| [η] (dl/g) | 3.0 |
| low-crystalline propylene random copolymer composition | |
| [I]/[II] weight ratio | 81/19 |
| propylene component (f) (mole %) | 86.2 |
| ethylene component (g) (mole %) | 1.6 |
| butene-1 component (h) (mole %) | 12.2 |
| [η] (dl/g) | 2.1 |
| MFR (dg/min.) | 5.8 |
| bulk density (g/ml) | 0.33 |
| crystallinity | 39 |
| p-xylene-soluble content (wt. %) | 23.6 |
| n-hexane-extracted content at 50° C. | 4.7 |
| (wt. %) | |
| Properties | |
| blocking property (g/cm) | 16 |
| complete heat-sealing temperature (°C.) | 114 |

EXAMPLE 14

Preparation of a titanium catalyst component (A)

A titanium catalyst component (A) was prepared in the same way as in Example 1. The resulting titanium catalyst component (A) contained 2.3% by weight of titanium, 58.0% by weight of chlorine, 18.0% by weight of magnesium and 14.0% by weight of diisobutyl phthalate. This titanium catalyst component was a granular catalyst component having an average particle diameter of 18 microns and a geometrical standard deviation ($\sigma_g$) of its particle size distribution of 1.2.

Prepolymerization

Prepolymerization was carried out in the same way as in Example 1. The amount of propylene prepolymerized was 98 g/g of catalyst.

Polymerization

A 50-liter autoclave purged with propylene was charged with 7.5 kg of propylene, 2.3 kg of butene-1 and 38 Nl of ethylene and 25 Nl of hydrogen. Then, the temperature was raised to 50° C., and 25 millimoles of triethyl aluminum, 25 millimoles of diphenyldimethoxysilane and 0.15 millimole, as titanium atom, of the titanium catalyst component subjected to the prepolymerization described above were added. The monomers were then then copolymerized at 60° C. for 15 minutes [suspension-polymerization step (1)].

Then, while maintaining a temperature of 50° C. in the autoclave, the pressure was released until the inside pressure of the autoclave reached 0.1 kg/cm²-G, thereby to remove the unreacted monomers in the autoclave [flushing step (2)].

Thereafter, 5 Nl of hydrogen was added, and a gaseous mixture of propylene and butene-1 in a mole ratio of 30:70 was fed into the autoclave until the inside pressure of the autoclave reached 5.5 kg/cm²-G. Vapor-phase polymerization was started. During the polymerization, the temperature was maintained at 50° C. The propylene/butene-1 gaseous mixture was supplied so as to maintain the pressure at 5.5 kg/cm²-G [vapor-phase polymerization step (3)]. After polymerization for 90 minutes, 5 ml of methanol was added to stop the polymerization. The pressure was released, and the resulting copolymer composition was recovered and dried overnight at 60° C. under a reduced pressure of 300 mmHg.

The properties of the resulting low-crystalline propylene copolymer composition are shown in Table 4.

Preparation of a Composite Film

The low-crystalline propylene copolymer composition obtained above was fed to a die for a two-layer film at a resin temperature of 240° C. Separately, crystalline polypropylene having an isotactic index of 96% and a melt index of 1.5 as a substrate was melted, and fed to the above die at a resin temperature of 240° C. The low-crystalline propylene copolymer composition and the substrate polypropylene were co-extruded to form a composite film composed of a substrate layer (40 microns) of the crystalline polypropylene and a layer (10 microns) of the low-crystalline propylene copolymer composition. The properties of the composite film are shown in Table 5.

EXAMPLES 15–16 AND COMPARATIVE EXAMPLE 1

Example 14 was repeated except that the low-crystalline propylene copolymer composition was synthesized under the conditions shown in Table 4. The results are shown in Tables 4 and 5.

EXAMPLE 17

The same crystalline polypropylene substrate as used in Example 14 was melted in an extruder and extruded from a T-die at a resin temperature of 270° C. and cooled and solidified in sheet form. It was then passed between hot rolls to stretch it longitudinally at a stretch ratio of 5 and form a monoaxially stretched sheet of crystalline polypropylene. The low-crystalline propylene copolymer composition described in Table 4 was melted and kneaded in another extruder and extruded from another T-die at a resin temperature of 250° C. and laminated to one surface of the monoaxially stretched sheet. The composite sheet was passed continuously through a heated tenter to stretch it transversely at a stretch ratio of 10 to obtain a composite polypropylene film composed of a substrate layer (22 microns) of the crystalline polypropylene and a layer (3 microns) of the low-crystalline propylene copolymer composition, in which the crystalline polypropylene substrate layer was biaxially stretched and the low-crystalline propylene copolymer composition layer was stretched monoaxially. The properties of the composite film are shown in Table 5.

TABLE 4

|  | Example 14 | Example 15 | Example 16 | Example 17 | Comparative Example 1 |
|---|---|---|---|---|---|
| Polymerization conditions | | | | | |
| Suspension polymerization step (1) | | | | | |
| propylene fed (kg) | 7.5 | 7.5 | 7.5 | 7.5 | 7.5 |
| 1-butane fed (kg) | 2.3 | 2.3 | 2.1 | 2.3 | 2.3 |
| ethylene fed (kg) | 38 | 38 | 38 | 33 | 38 |
| hydrogen fed (Nl) | 25 | 25 | 25 | 25 | 25 |
| electron donor | diphenyl-dimethoxy-silane | t-butyl-methyl-dimethoxy-silane | diphenyl-dimethoxy-silane | cyclohexyl-methyl-dimethoxy-silane | diphenyl-dimethoxy-silane |
| temperature (°C.) | 60 | 60 | 60 | 60 | 60 |
| time (min.) | 15 | 15 | 15 | 15 | 15 |
| Vapor-phase polymerization step | | | | | |
| propylene/butene-1 (mole ratio) | 30/70 | 30/70 | 25/75 | 30/70 | 30/70 |
| temperature (°C.) | 50 | 60 | 60 | 55 | 60 |
| time (min.) | 120 | 30 | 50 | 80 | 180 |
| pressure (kg/cm²-G) | 5.5 | 7 | 6.5 | 6.7 | 7.3 |
| hydrogen fed (Nl) | 5 | 5 | 1.3 | 2.4 | 2.4 |
| [I] propylene random copolymer | | | | | |
| propylene component (a) (mole %) | 91.4 | 91.5 | 91.2 | 92.5 | 91.8 |
| ethylene component (b) (mole %) | 2.8 | 2.8 | 2.6 | 2.0 | 2.8 |
| butene-1 component (c) (mole %) | 5.8 | 5.7 | 5.2 | 5.5 | 5.4 |
| c/(b + c) (mole ratio) | 0.67 | 0.67 | 0.67 | 0.73 | 0.66 |
| $[\eta]$ (dl/g) | 1.8 | 2.1 | 2.5 | 2.2 | 2.1 |
| DSC melting point (°C.) | 128 | 128 | 130 | 132 | 129 |
| crystallinity (%) | 43 | 43 | 44 | 44 | 43 |
| [II] low-crystalline propylene random copolymer | | | | | |
| propylene component (d) (mole %) | 76 | 74 | 56 | 73 | 75 |
| butene-1 component (e) (mole %) | 24 | 26 | 44 | 27 | 25 |
| $[\eta]$ (dl/g) | 3.1 | 3.2 | 3.2 | 3.3 | 3.1 |
| low-crystalline propylene copolymer composition | | | | | |
| [I]/[II] weight ratio | 77/23 | 91/9 | 85/15 | 90/10 | 57/43 |
| propylene component (f) | 88.0 | 89.8 | 88.3 | 90.3 | 84.9 |

TABLE 4-continued

| | Example | | | | Comparative |
|---|---|---|---|---|---|
| | 14 | 15 | 16 | 17 | Example 1 |
| (mole %) | | | | | |
| ethylene component (g) (mole %) | 2.3 | 2.8 | 1.3 | 1.7 | 1.7 |
| butene-1 component (h) (mole %) | 9.7 | 7.4 | 10.4 | 8.0 | 13.4 |
| $[\eta]$ (dl/g) | 2.1 | 2.2 | 2.6 | 2.3 | 2.3 |
| MFR (dg/min.) | 5.6 | 4.4 | 2.0 | 4.0 | 3.8 |
| bulk density (g/ml) | 0.34 | 0.37 | 0.36 | 0.38 | 0.31 |
| crystallinity (%) | 39 | 40 | 39 | 41 | 35 |
| p-xylene-soluble content (wt. %) | 24.3 | 20.6 | 24.1 | 18.7 | 37.3 |
| n-hexane-extracted content at 50° C. (wt. %) | 4.8 | 4.3 | 5.1 | 4.0 | 11 |

TABLE 5

| | | | Example | | | Comparative |
|---|---|---|---|---|---|---|
| | | | 14 | 15 | 16 | 17 | Example 1 |
| Haze (%) | | | 3.4 | 3.6 | 4.0 | 2.5 | 3.7 |
| Blocking value (g/cm) | | | 1.0 | 0.8 | 1.1 | 0.5 | 5.9 |
| Slip property | 1 day late | | 0.43/0.41 | 0.34/0.30 | 0.42/0.38 | 0.34/0.30 | 0.55/0.52 |
| (coefficient of static friction/ coefficient of dynamic friction) | 7 days late | | 0.48/0.45 | 0.36/0.34 | 0.43/0.40 | 0.36/0.34 | 0.68/0.61 |
| Heat seal strength (g/15 mm) | before aging | 100° C. | 50 | — | 60 | 100 | 70 |
| | | 110° C. | 270 | 200 | 300 | 450 | 280 |
| | | 120° C. | 790 | 830 | 810 | 530 | 790 |
| | | 130° C. | 900 | 950 | 910 | 510 | 860 |
| | | 140° C. | 950 | 960 | 900 | 500 | 900 |
| | 7 days after aging at 50° C. | 100° C. | — | — | — | 40 | — |
| | | 110° C. | 180 | 170 | 110 | 380 | 100 |
| | | 120° C. | 750 | 810 | 710 | 510 | 500 |
| | | 130° C. | 950 | 900 | 890 | 500 | 850 |
| | | 140° C. | 930 | 910 | 870 | 500 | 870 |

What is claimed is:

1. A low-crystalline propylene random copolymer composition comprising

[I] 60 to 95% by weight of a propylene random copolymer characterized by
  (A) being composed of 97 to 86 mole % of recurring units (a) derived from propylene, 0.5 to 6 mole % of recurring units (b) derived from ethylene and 2 to 13 mole % of recurring units (c) derived from an alpha-olefin having 4 to 20 carbon atoms, the mole ratio of c/(b+c) being from 0.3 to 0.9,
  (B) having an intrinsic viscosity $[\eta]$, measured in decalin at 135° C., of from 0.5 to 6 dl/g,
  (C) having a melting point [Tm], measured by a differential scanning calorimeter, of from 115° to 145° C., and
  (D) having a crystallinity, measured by X-ray diffractometry, of from 30 to 60%, and

[II] 5 to 40% by weight of a low-crystalline propylene random copolymer composed of 10 to 90 mole % of recurring units (d) derived from propylene and 10 to 90 mole % of recurring units (e) derived from an alpha-olefin having 4 to 20 carbon atoms, said composition having
  (i) 75 to 96 mole % of recurring units (f) derived from propylene, 0.3 to 5 mole % of recurring units (g) derived from ethylene and 4 to 20 mole % of recurring units (h) derived from an alpha-olefin containing 4 to 20 carbon atoms,
  (ii) an intrinsic viscosity $[\eta]$, measured in decalin at 135° C., of from 0.5 to 6 dl/g,
  (iii) a crystallinity, measured by X-ray diffractometry, of from 25 to 60%,
  (iv) a p-xylene-soluble content at 25° C. of not more than 30% by weight, and
  (v) an n-hexane-extracted content at 50° C. of not more than 10% by weight.

2. The composition of claim 1 wherein the proportion of the recurring units (a) derived from propylene is 88 to 96 mole %, the proportion of the recurring units (b) derived from ethylene is 1 to 5 mole %, the proportion of the recurring units (c) derived from the alpha-olefin is 3 to 11 mole %, and the mole ratio c/(b+c) is 0.4 to 0.8, the proportion of the recurring units (d) derived from propylene is 30 to 85 mole % and the proportion of the recurring units (e) derived from the alpha-olefin is 15 to 70 mole %, the proportion of the recurring units (f) derived from propylene is 80 to 94 mole %, the proportion of the recurring units (g) derived from ethylene is 0.7 to 4.5 mole %, and the proportion of the recurring units (h) derived from the alpha-olefin is 5 to 15 mole %, and the low crystalline propylene random copolymer composition is formed of 70 to 92% by weight of the propylene random copolymer and 8 to 30% by weight of the low-crystalline propylene random copolymer.

3. The composition of claim 1 wherein the proportion of the recurring units (a) derived from propylene is 89 to 95 mole %, the proportion of the recurring units (b) derived from ethylene is 1.5 to 4 mole %, the proportion of the recurring units (c)

derived from the alpha-olefin is 4 to 9 mole %, and the mole ratio c/(b+c) is 0.5 to 0.8, the proportion of the recurring units (d) rived from propylene is 50 to 80 mole % and the proportion of the recurring units (e) derived from the alpha-olefin is 20 to 50 mole %, the proportion of the recurring units (f) derived from. propylene is 84 to 92 mole %, the proportion of the recurring units (g) derived from ethylene is 1 to mole %, andthe proportion of the recurring units (h) derived from the alpha-olefin is 7 to 12 mole %, and the low crystalline propylene random copolymer composition is formed of 75 to 88% by weight of the propylene random copolymer and 7 to 12% by weight of the low-crystalline propylene random copolymer.

* * * * *

UNITED STATES PATENT AND TRADEMARK OFFICE
CERTIFICATE OF CORRECTION

PATENT NO. : 4,822,840
DATED : April 18, 1989
INVENTOR(S) : MAMORU KIOKA, ET AL.

It is certified that error appears in the above-identified patent and that said Letters Patent is hereby corrected as shown below:

IN THE CLAIMS

Column 45, claim 3, line 3, delete "rived", insert --derived--;

Column 46, line 1, before "mole", insert --4--; delete "andthe", insert --and the--.

Signed and Sealed this

Twenty-first Day of November, 1989

Attest:

JEFFREY M. SAMUELS

Attesting Officer     Acting Commissioner of Patents and Trademarks